US010347935B2

(12) United States Patent
Mochizuki et al.

(10) Patent No.: US 10,347,935 B2
(45) Date of Patent: Jul. 9, 2019

(54) SOLID ELECTROLYTE COMPOSITION, ELECTRODE SHEET FOR BATTERY AND ALL-SOLID-STATE SECONDARY BATTERY IN WHICH SOLID ELECTROLYTE COMPOSITION IS USED, AND METHOD FOR MANUFACTURING ELECTRODE SHEET FOR BATTERY AND ALL-SOLID-STATE SECONDARY BATTERY

(71) Applicant: FUJIFILM Corporation, Tokyo (JP)

(72) Inventors: Hiroaki Mochizuki, Ashigarakami-gun (JP); Tomonori Mimura, Ashigarakami-gun (JP); Masaomi Makino, Ashigarakami-gun (JP); Katsuhiko Meguro, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 47 days.

(21) Appl. No.: 15/220,567

(22) Filed: Jul. 27, 2016

(65) Prior Publication Data

US 2016/0336613 A1 Nov. 17, 2016

Related U.S. Application Data

(63) Continuation of application No. PCT/JP2015/052560, filed on Jan. 29, 2015.

(30) Foreign Application Priority Data

Feb. 3, 2014 (JP) ................................. 2014-018701
Jan. 27, 2015 (JP) ................................. 2015-013306

(51) Int. Cl.
*H01M 10/056* (2010.01)
*H01M 4/13* (2010.01)
(Continued)

(52) U.S. Cl.
CPC ......... *H01M 10/056* (2013.01); *C08F 220/18* (2013.01); *H01B 1/122* (2013.01);
(Continued)

(58) Field of Classification Search
CPC .... H01M 10/056; H01M 4/13; H01M 10/052; H01M 10/0585; C08F 220/18
See application file for complete search history.

(56) References Cited

U.S. PATENT DOCUMENTS 5,516,598 A 5/1996 Visco et al.
6,506,523 B1 1/2003 Hatazawa et al.
(Continued)

FOREIGN PATENT DOCUMENTS

CN 1159253 A 9/1997
CN 1266540 A 9/2000
(Continued)

OTHER PUBLICATIONS

Communication dated Jan. 25, 2017 issued by the State Intellectual Office of People's Republic of China in counterpart application No. 201580006287.1.

(Continued)

*Primary Examiner* — Helen Oi K Conley
(74) *Attorney, Agent, or Firm* — Sughrue Mion, PLLC

(57) ABSTRACT

A solid electrolyte composition includes an inorganic solid electrolyte having conductivity of metal ion belonging to Group 1 or 2 of the periodic table; and a multibranched polymer, in which the multibranched polymer is an amorphous polymer and includes a core portion and at least three polymeric arm portions that bond to the core portion.

17 Claims, 2 Drawing Sheets

(51) Int. Cl.

| | |
|---|---|
| ***H01M 4/139*** | (2010.01) |
| ***H01M 10/0585*** | (2010.01) |
| ***C08F 220/18*** | (2006.01) |
| ***H01M 10/052*** | (2010.01) |
| ***H01B 1/12*** | (2006.01) |

(52) U.S. Cl.

CPC ............. *H01M 4/13* (2013.01); *H01M 4/139* (2013.01); *H01M 10/052* (2013.01); *H01M 10/0585* (2013.01); *H01M 2300/0068* (2013.01); *H01M 2300/0082* (2013.01); *H01M 2300/0088* (2013.01); *Y02T 10/7011* (2013.01)

(56) References Cited

U.S. PATENT DOCUMENTS

| | | | |
|---|---|---|---|
| 2012/0052397 | A1 | 3/2012 | Mikhaylik et al. |
| 2012/0315547 | A1 | 12/2012 | Itoh et al. |

FOREIGN PATENT DOCUMENTS

| | | | |
|---|---|---|---|
| CN | 103270624 | A | 8/2013 |
| EP | 0 682 059 | A1 | 11/1995 |
| JP | 2000-17017 | A | 1/2000 |
| JP | 2002-226513 | A | 8/2002 |
| JP | 2007-131784 | A | 5/2007 |
| JP | 2011-14387 | A | 1/2011 |
| JP | 2011-233422 | A | 11/2011 |
| JP | 2013-8611 | A | 1/2013 |
| WO | 2011/099497 | A1 | 8/2011 |
| WO | 2013/001623 | A1 | 1/2013 |
| WO | 2013/118230 | A1 | 8/2013 |

OTHER PUBLICATIONS

International Search Report for PCT/JP2015/052560 dated Apr. 28, 2015.

Communication dated Sep. 11, 2017 from the State Intellectual Property Office of the P.R.C. in counterpart application No. 201580006287.1.

SOLID ELECTROLYTE COMPOSITION, ELECTRODE SHEET FOR BATTERY AND ALL-SOLID-STATE SECONDARY BATTERY IN WHICH SOLID ELECTROLYTE COMPOSITION IS USED, AND METHOD FOR MANUFACTURING ELECTRODE SHEET FOR BATTERY AND ALL-SOLID-STATE SECONDARY BATTERY

CROSS-REFERENCE TO RELATED APPLICATIONS

This application is a Continuation of PCT International Application No. PCT/JP2015/052560 filed on Jan. 29, 2015, which claims priority under 35 U.S.C. § 119 (a) to Japanese Patent Application No. 2014-018701 filed on Feb. 3, 2014, and to Japanese Patent Application No. 2015-013306 filed on Jan. 27, 2015. Each of the above applications is hereby expressly incorporated by reference, in its entirety, into the present application.

BACKGROUND OF THE INVENTION

1. Field of the Invention

The present invention relates to a solid electrolyte composition, an electrode sheet for a battery and an all-solid-state secondary battery in which the solid electrolyte composition is used, and a method for manufacturing the electrode sheet for a battery and the all-solid-state secondary battery.

2. Description of the Related Art

An electrolyte solution is used in a lithium ion battery which is widely used currently in many cases. There has been an attempt to cause all configuration materials to be solid by substituting the electrolyte solution with a solid electrolyte. Above all, one of the advantages of the technique of using an inorganic solid electrolyte is reliability. A combustible material such as a carbonate-based solvent is applied as a medium of the electrolyte solution which is used in the lithium ion secondary battery. Various measures are employed, but an additional measurement to be performed when a battery is overcharged is desired. An all-solid-state secondary battery formed of an inorganic compound that can cause an electrolyte to be incombustible is regarded as solving means thereof.

Another advantage of the all-solid-state secondary battery is that a high energy density is suitably achieved by stacking electrodes. Specifically, the all-solid-state secondary battery can be a battery having a structure in which electrodes and electrolytes are directly arranged side by side to be serialized. At this point, a metal package that seals battery cells and a copper wire or a bus bar that connects battery cells can be omitted, and thus an energy density of the battery can be greatly increased. It is advantageous that compatibility with a positive electrode material in which a potential can be enhanced to a high level is good.

According to the respective advantages as described above, the development of the all-solid-state secondary battery as a next-generation lithium ion secondary battery is energetically advanced (see NEDO: New Energy and Industrial Technology Development Organization, Fuel Cells-Hydrogen Technology Development Field, Electricity Storage Technology Development Division "NEDO 2008 Roadmap for the Development of Next Generation Automotive Battery Technology" (June 2009)). Meanwhile, the inorganic all-solid-state secondary battery has a disadvantage caused by the fact that the electrolyte thereof is a hard solid. Examples thereof include increase of resistance on an interface between solid particles (solid electrolytes). In order to improve this, there is an example in which a specific polymer compound is used as a binder. Specifically, in JP2013-008611A, an interface activator having a polyoxyethylene chain is used. JP2011-233422A discloses the use of a norbornene-based polymer, and WO2013/001623A discloses the use of hydrogenated butadiene rubber.

SUMMARY OF THE INVENTION

It is considered that, according to the research in JP2013-008611A, JP2011-233422A, and WO2013/001623A described above, the increase of the interface resistance in the all-solid-state secondary battery can be improved to some extent. However, the binders consisting of the polymer compounds disclosed in JP2013-008611A, JP2011-233422A, and WO2013/001623A described above may not satisfy the high level required recently and further improvement is required.

Therefore, an object of the invention is to provide a solid electrolyte composition that can prevent an increase of interface resistance between solid particles and between solid particles and a collector, not by performing pressurization, and thus that can exhibit excellent ion conductivity and realize favorable electrode flexibility, in the all-solid-state secondary battery, and an electrode sheet for a battery and an all-solid-state secondary battery using the same, and a method for manufacturing the electrode sheet for the battery and the all-solid-state secondary battery.

The objects above are achieved by the following means.

[1] A solid electrolyte composition comprising: an inorganic solid electrolyte; and a multibranched polymer, in which the multibranched polymer is an amorphous polymer and includes a core portion and at least three polymeric arm portions that bond to the core portion.

[2] The solid electrolyte composition according to [1], in which the arm portion contains at least one repeating unit expressed by Formula (I) below, and (I)

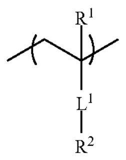

in the formula, $R^1$ represents a hydrogen atom, a halogen atom, a cyano group, an alkyl group, an alkoxy group, or an aryl group, $R^2$ represents a hydrogen atom, a halogen atom, a cyano group, an acidic group, an alkyl group having a hydroxy group, or an aryl group having an acidic group or a hydroxy group, and $L^1$ represents a single bond or a bivalent linking group.

[3] The solid electrolyte composition according to [2], in which the $L^1$ is a bivalent linking group selected from a single bond, —CO—, —O—, —$NR^N$—, —COO—, —OCO—, —OCOO—, —$CONR^N$—, arylene, alkylene, or a combination thereof, and $R^N$ represents a hydrogen atom, an alkyl group having 1 to 6 carbon atoms, or an aryl group having 6 to 14 carbon atoms.

[4] The solid electrolyte composition according to [2] or [3], in which the $R^2$ is a group having an acidic group or a hydroxy group.

[5] The solid electrolyte composition according to [2] or [3], in which the $R^2$ is a group including at least one selected from a carboxyl group or a salt thereof, or a phosphoric acid group or a salt thereof.

[6] The solid electrolyte composition according to any one of [1] to [5], in which the arm portion is formed with a polymer chain, and a copolymerization ratio of the repeating unit having a functional group A below with respect to the repeating units that form the arm portion is 0.1 mol % to 40 mol %.

Functional group A: a halogen atom, a cyano group, an acidic group, a hydroxy group, an amino group, or an amide group

[7] The solid electrolyte composition according to any one of [1] to [6], in which the multibranched polymer is expressed by Formula (1) below, and $$L\text{-}(S-P^1)_n \qquad (1)$$

in the formula, L represents a trivalent or higher polyvalent linking group, $P^1$ represents a polymer chain, n represents an integer of 3 or greater, n items of $P^1$'s may be identical to or different from each other, L-$(S)_n$ forms a core portion, and $P^1$ forms an arm portion.

[8] The solid electrolyte composition according to [7], in which L is a linking group including a carbon atom, a hydrogen atom, and an oxygen atom.

[9] The solid electrolyte composition according to any one of [1] to [8], in which the multibranched polymer is expressed by Formula (2) below, and (2)

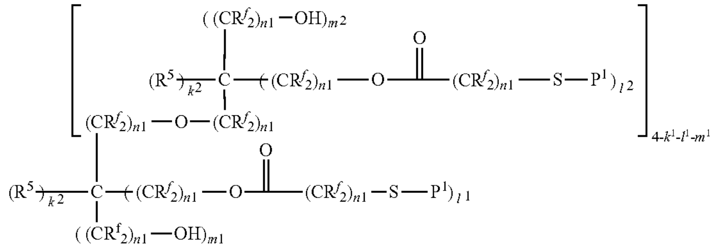

in the formula, each of $R^5$ and $R^f$ independently represents a hydrogen atom or a substituent, each of n1's independently represents an integer of 0 to 10, $k^1$ represents an integer of 0 to 3, $l^1$ represents an integer of 0 to 4, $m^1$ represents an integer of 0 to 3, $k^2$ represents an integer of 0 to 3, $l^2$ represents an integer of 0 to 3, $m^2$ represents an integer of 0 to 3, a sum of $k^1$, $l^1$, and $m^1$ is 4 or less, a sum of $k^2$, $l^2$, and $m^2$ is 3 or less, $l^1+l^2\times(4-k^1-l^1-m^1)$ is 3 or greater, the number of groups having $P^1$ in the formula is 3 or greater, $P^1$ represents a polymer chain, $R^f$ represents a hydrogen atom or a substituent, $P^1$ is an arm portion, and portions other than $P^1$ are core portions.

[10] The solid electrolyte composition according to any one of [1] to [9], in which the core portion is an atom group having a molecular weight of 200 or greater.

[11] The solid electrolyte composition according to any one of [1] to [10], in which a weight average molecular weight of the arm portion is 500 to 1,000,000.

[12] The solid electrolyte composition according to any one of [1] to [11], in which a glass transition point of the multibranched polymer is 100° C. or less.

[13] The solid electrolyte composition according to any one of [1] to [12], further comprising: a dispersion medium.

[14] The solid electrolyte composition according to [13], in which the multibranched polymer is dispersed in a dispersion medium, and an average particle diameter thereof is 1 nm to 1,000 nm.

[15] The solid electrolyte composition according to any one of [1] to [14], further comprising: an active substance that can insert and discharge a metal ion belonging to Group 1 or 2 of the periodic table.

[16] The solid electrolyte composition according to any one of [1] to [15], in which the multibranched polymer is applied by 0.1 parts by mass to 10 parts by mass with respect to 100 parts by mass of the inorganic solid electrolyte.

[17] An electrode sheet for a battery, in which a film is formed on a metallic foil with the solid electrolyte composition according to any one of [1] to [16].

[18] An all-solid-state secondary battery, comprising: a positive electrode active substance layer; a negative electrode active substance layer; and an inorganic solid electrolyte layer, in which at least one of the positive electrode active substance layer, the negative electrode active substance layer, or the inorganic solid electrolyte layer is formed with the solid electrolyte composition according to any one of [1] to [16].

[19] A method for manufacturing an electrode sheet for a battery comprising: disposing the solid electrolyte composition according to any one of [1] to [16] on a metallic foil; and forming a film with the solid electrolyte composition.

[20] A method for manufacturing an all-solid-state secondary battery, in which, through the manufacturing method according to [19], an all-solid-state secondary battery having the electrode sheet for a battery is manufactured.

In this specification, the numerical range expressed by using the expression "to" means a range including numerical values before and after the expression "to" as the lower limit and the upper limit.

In this specification, when there are plural substituents or linking groups indicated with specific reference symbols, or plural substituents or the like (in the same manner as in the definition of the number of substituents) are simultaneously or alternatively defined, the respective substituents may be identical to or different from each other. When the plural substituents and the like are in vicinity to each other, those may be bonded or condensed to each other to form a ring.

The solid electrolyte composition according to the invention exhibits effect of suppressing the increase of the interface resistance between solid particles or between the solid particles and the collector without pressurization when being used as materials of the inorganic solid electrolyte layer or the active substance layer of the all-solid-state secondary battery, and thus having an excellent effect of exhibiting excellent ion conductivity and realizing favorable electrode flexibility.

The electrode sheet for the battery and the all-solid-state secondary battery according to the invention include the solid electrolyte composition and exhibit favorable performances. In the manufacturing method according to the invention, the electrode sheet for the battery and the all-solid-state secondary battery can be suitably manufactured.

Aforementioned and additional features and advantages of the invention are clearly presented from the following descriptions suitably referring to the accompanying drawings.

DESCRIPTION OF THE PREFERRED EMBODIMENTS

The solid electrolyte composition according to the invention includes an inorganic solid electrolyte and a multibranched polymer. Hereinafter, preferred embodiments thereof are described, but an example of the all-solid-state secondary battery which is a preferred application is described.

Figure 1:
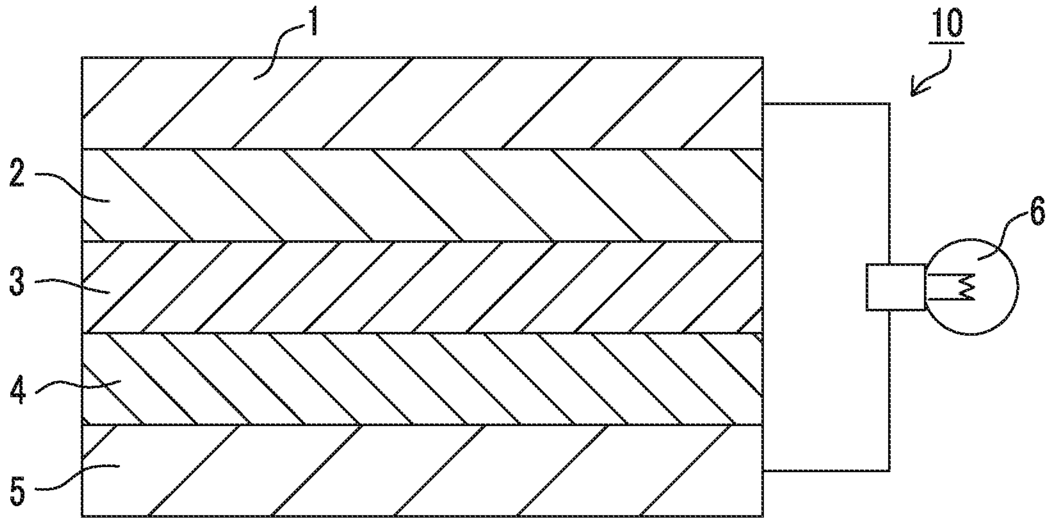
FIG. 1 is a cross-sectional view schematically illustrating an all-solid-state lithium ion secondary battery according to a preferred embodiment of the invention.

FIG. 1 is a sectional view schematically illustrating an all-solid-state secondary battery (lithium ion secondary battery) according to a preferred embodiment of the invention. An all-solid-state secondary battery 10 according to the embodiment includes a negative electrode collector 1, a negative electrode active substance layer 2, an inorganic solid electrolyte layer 3, a positive electrode active substance layer 4, and a positive electrode collector 5, in this sequence, from the negative electrode side. The respective layers are in contact with each other, and form a stacked structure. If this structure is applied, when the battery is charged, electrons ($e^-$) are supplied to a negative electrode side and lithium ions ($Li^+$) are accumulated thereto. Meanwhile, when the battery is discharged, the lithium ions ($Li^+$) accumulated in the negative electrode are returned to the positive electrode side, and electrons are supplied to an operating position 6. In the illustrated example, a bulb is employed in the operating position 6, and the bulb is turned on by the discharge. The solid electrolyte composition according to the invention is preferably used as a configuration material of the negative electrode active substance layer, the positive electrode active substance layer, and the inorganic solid electrolyte layer. Among them, the inorganic solid electrolyte composition according to the invention is preferably used as a configuration material of all of the inorganic solid electrolyte layer, the positive electrode active substance layer, and the negative electrode active substance layer.

Thicknesses of the positive electrode active substance layer 4, the inorganic solid electrolyte layer 3, and the negative electrode active substance layer 2 are not particularly limited, but the thicknesses of the positive electrode active substance layer and the negative electrode active substance layer can be arbitrarily determined according to a desired capacity of a battery. Meanwhile, the inorganic solid electrolyte layer is desirably thinned while preventing a short circuit of positive and negative electrodes. Specifically, the thickness is preferably 1 μm to 1,000 μm and more preferably 3 μm to 400 μm.

<Solid Electrolyte Composition>

The solid electrolyte composition according to the invention is a composition including an inorganic solid electrolyte and is used as a material of forming an inorganic solid electrolyte layer, a positive electrode active substance layer, and a negative electrode active substance layer of the all-solid-state secondary battery. The solid electrolyte composition is not limited to a solid state, and may be a liquid state or a paste state.

(Inorganic Solid Electrolyte)

The inorganic solid electrolyte is an inorganic solid electrolyte. In this specification, the solid electrolyte means a solid-state electrolyte in which ions can move inside thereof. In this point of view, considering the distinction from electrolyte salt (supporting electrolyte) below, the inorganic solid electrolyte may be called an ion conductive inorganic solid electrolyte. The ion conductance of the inorganic solid electrolyte is not particularly limited. However, in the lithium ion, the ion conductance of the inorganic solid electrolyte is preferably $1\times10^{-6}$ S/cm or greater, more preferably $1\times10^{-5}$ S/cm or greater, even more preferably $1\times10^{-4}$ S/cm or greater, and particularly preferably $1\times10^{-3}$ S/cm or greater. The upper limit thereof is not particularly limited, but is practically 1 S/cm or less. Unless described otherwise, a method of measuring ion conductance is performed according to non-pressurization condition measured in the examples below.

The inorganic solid electrolyte is differentiated from a polymer electrolyte represented by organic solid electrolyte or polyethylene oxide (PEO), an organic electrolyte salt represented by lithium bistrifluoromethanesulfonimide (LiTFSI) or the like, since the polymer compound or an organic material such as a complex salt is not included as an electrolyte. Since the inorganic solid electrolyte is a non-dissociative solid in a normal state, the inorganic solid electrolyte is not decomposed or separated to cations and anions even in the liquid. In this point of view, the inorganic solid electrolyte is clearly differentiated from inorganic electrolyte salt (such as $LiPF_6$, $LiBF_4$, lithium bis(fluorosulfonyl)imide [LiFSI], or LiCl) which is decomposed or separated to cations and anions in the electrolysis liquid or the polymer. While the inorganic solid electrolyte has conductivity of a metal ion (preferably lithium ions) belonging to Group 1 or 2 of the periodic table, it is general that the inorganic solid electrolyte does not have electron conductivity.

According to the invention, the electrolyte layer or the active substance layer is caused to contain the inorganic solid electrolyte having conductivity of a metal ion (preferably, a lithium ion) belonging to Group 1 or 2 of the periodic table. The inorganic solid electrolyte can be used by suitably selecting a solid electrolyte material applied to these kinds of products. Representative examples of the inorganic solid electrolyte include (i) a sulfide-based inorganic solid electrolyte and (ii) an oxide-based inorganic solid electrolyte.

(i) Sulfide-Based Inorganic Solid Electrolyte

It is preferable that the sulfide-based inorganic solid electrolyte (hereinafter, simply referred to as a "sulfide solid electrolyte") contains a sulfur atom (S), has conductivity of an ion of metal belonging to Group 1 or 2 in the periodic table, and has electron insulation properties. Examples thereof include a lithium ion conductive inorganic solid electrolyte satisfying the composition formula presented in Formula (A) below.

$$Li_aM_bP_cS_d \quad (A)$$

(In the formula, M represents an element selected from B, Zn, Si, Cu, Ga, and Ge. a to d represent composition ratios of respective elements, and a:b:c:d satisfies 1 to 12:0 to 1:1:2 to 9, respectively.)

In Formula (A), with respect to the composition ratios of Li, M, P, and S, it is preferable that b is 0, it is more preferable that b=0, and a composition (a:c:d) of a, c, and d satisfies a:c:d=1 to 9:1:3 to 7, and it is still more preferable that b=0 and a:c:d=1.5 to 4:1:3.25 to 4.5. The composition ratio of the respective elements can be controlled by adjusting a blending amount of raw material compounds when a sulfide-based solid electrolyte is manufactured, as described below.

The sulfide-based solid electrolyte may be amorphous (glass) or may be crystallized (formed into glass ceramic), or a portion thereof may be crystallized.

In Li—P—S-based glass and Li—P—S-based glass ceramics, the ratio of $Li_2S$ and $P_2S_5$ is preferably 65:35 to 85:15 and more preferably 68:32 to 75:25 in the molar ratio of $Li_2S$:$P_2S_5$. If the ratio of $Li_2S$ and $P_2S_5$ is in the range described above, lithium ion conductance can be increased. Specifically, the lithium ion conductance can be preferably $1\times10^{-4}$ S/cm or higher and more preferably $1\times10^{-3}$ S/cm or higher.

Specific compound examples thereof include a compound obtained by using a raw material composition containing, for example, $Li_2S$ and sulfide of an element of Groups 13 to 15.

More specific examples thereof include $Li_2S—P_2S_5$, $Li_2S—GeS_2$, $Li_2S—GeS_2—ZnS$, $Li_2S—Ga_2S_3$, $Li_2S—GeS_2—Ga_2S_3$, $Li_2S—GeS_2—P_2S_5$, $Li_2S—GeS_2—Sb_2S_5$, $Li_2S—GeS_2—Al_2S_3$, $Li_2S—SiS_2$, $Li_2S—Al_2S_3$, $Li_2S—SiS_2—Al_2S_3$, $Li_2S—SiS_2—P_2S_5$, $Li_2S—SiS_2—LiI$, $Li_2S—SiS_2—Li_4SiO_4$, $Li_2S—SiS_2—Li_3PO_4$, and $Li_{10}GeP_2S_{12}$. Among these, a crystalline and/or amorphous raw material composition formed of $Li_2S—P_2S_5$, $Li_2S—GeS_2—Ga_2S_3$, $Li_2S—GeS_2—P_2S_5$, $Li_2S—SiS_2—P_2S_5$, $Li_2S—SiS_2—Li_4SiO_4$, and $Li_2S—SiS_2—Li_3PO_4$ is preferable, since the crystalline and/or amorphous raw material composition has high lithium ion conductivity. Examples of the method of synthesizing a sulfide solid electrolyte material by using such a raw material composition include an amorphizing method. Examples of the amorphizing method include a mechanical milling method and a melt quenching method, and among these, a mechanical milling method is preferable, because a treatment at room temperature becomes possible, and thus the simplification of the manufacturing step is achieved.

The sulfide solid electrolyte can be synthesized with reference to non patent documents, T. Ohtomo, A. Hayashi, M. Tatsumisago, Y. Tsuchida, S. Hama, K. Kawamoto, Journal of Power Sources, 233, (2013), pages 231 to 235 and A. Hayashi, S. Hama, H. Morimoto, M. Tatsumisago, T. Minami, Chem. Lett., (2001), pages 872 to 873.

(ii) Oxide-Based Inorganic Solid Electrolyte

It is preferable that the oxide-based inorganic solid electrolyte contains an oxygen atom (O), has conductivity of an ion of metal belonging to Group 1 or 2 in the periodic table, and has electron insulation properties.

Specific examples of the compound include $Li_xLa_yTiO_3$ [x=0.3 to 0.7 and y=0.3 to 0.7](LLT), $Li_7La_3Zr_2O_{12}$ (LLZ), $Li_{3.5}Zn_{0.25}GeO_4$ having a lithium super ionic conductor (LISICON)-type crystal structure, $LiTi_2P_3O_{12}$, $Li_{1+x+y}(Al,Ga)_x(Ti,Ge)_{2-x}Si_yP_{3-y}O_{12}$ having a natrium super ionic conductor (NASICON)-type crystal structure (here, 0≤x≤1 and 0≤y≤1), and aforementioned $Li_7La_3Zr_2O_{12}$ having a garnet-type crystal structure. A phosphorus compound including Li, P, and O is desirable. Examples of the phosphorus compound include lithium phosphate ($Li_3PO_4$), and LiPON or LiPOD (D represents at least one type selected from Ti, V, Cr, Mn, Fe, Co, Ni, Cu, Zr, Nb, Mo, Ru, Ag, Ta, W, Pt, or Au) in which a portion of oxygen atoms in lithium phosphate is substituted with nitrogen atoms. LiAON (A represents at least one type selected from Si, B, Ge, Al, C, or Ga) and the like can be preferably used.

Among these, $Li_{1+x+y}(Al,Ga)_x(Ti,Ge)_2$-$xSi_yP_3$-$yO_{12}$ (here, 0≤x≤1 and 0≤y≤1) are preferable, since $Li_{1+x+y}(Al,Ga)_x(Ti,Ge)_2$-$xSi_yP_3$-$yO_{12}$ have high lithium ion conductivity, are chemically stable, and are easily managed. These may be used singly or two or more types thereof may be used in combination.

The ion conductance of the lithium ion conductive oxide-based inorganic solid electrolyte is preferably $1\times10^{-6}$ S/cm or higher, more preferably $1\times10^{-5}$ S/cm or higher, and particularly preferably $5\times10^{-5}$ S/cm or higher.

Since the oxide-based inorganic solid electrolyte has an oxygen atom in the structure thereof, it is preferable to use a binder having high affinity. In this point of view, the multibranched polymer below preferably has a hetero atom such as an oxygen atom in the arm portion and preferably includes a polar group such as functional groups A to D or the like described below. Accordingly, it is expected that the binder is more strongly fixed to inorganic solid electrolyte particles, and more favorable performances can be obtained in the decrease of the interface resistance or the like.

The inorganic solid electrolyte may be used singly or two or more types thereof may be used in combination.

The average particle diameter of the inorganic solid electrolyte is not particularly limited, but the average particle diameter is preferably 0.01 μm or greater and more preferably 0.1 μm or greater. The upper limit thereof is preferably 100 μm or less and more preferably 50 μm or less.

If compatibility between battery properties and a decrease and maintenance effect of the interface resistance is considered, the concentration of the inorganic solid electrolyte in the solid electrolyte composition is preferably 50 mass % or more, more preferably 70 mass % or more, and particularly preferably 90 mass % or more with respect to 100 mass % of the solid component. In the same point of view, the upper limit of the concentration is preferably 99.9 mass % or less, more preferably 99.5 mass % or less, and particularly preferably 99.0 mass % or less.

(Multibranched Polymer)

The multibranched polymer used in the invention is amorphous (non-crystalline) polymer. Here, the expression "amorphous" can be described as below. The polymer compound can be greatly divided into two states: a state in which molecules thereof are regularly arranged (crystalline state) and a state in which a polymer exists in a yarn ball shape or in a tangled manner (non-crystalline state). Even if the polymer compound is the crystalline polymer, not all portions become crystalline state, crystalline portions and non crystalline portions are generally mixed in all cases. In this point of view, in the DSC chart, two of the glass transition point (Tg) and the melting point (Tm) are detected, can be graded as the crystalline polymer.

Figure 3:
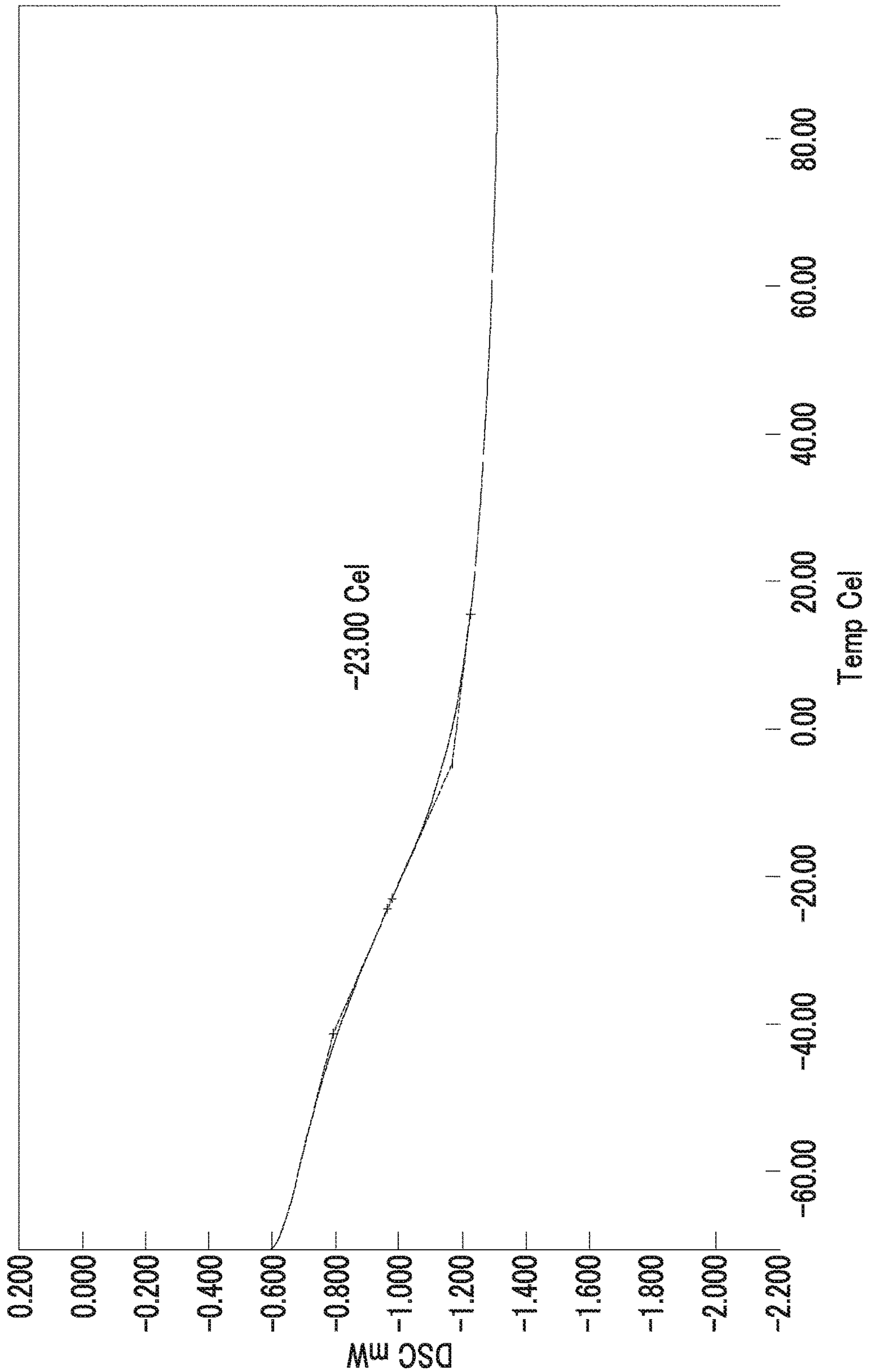
FIG. 3 is a graph illustrating results of DSC measurement of a multibranched polymer prepared in the example.

Since the multibranched polymer used in the invention is an amorphous polymer, the melting point is not substantially detected. As a specific method of reading the chart, as illustrated in FIG. 3 in the accompanying drawings, the multibranched polymer can be determined by reading the glass transition point in the DSC measurement. Specifically, it is known that a proportion of Tg and Tm (Tg/Tm) is about ⅔ in an asymmetric non-crystalline polymer compound, by experience. Accordingly, it is possible to confirm amorphous properties from the fact that a melting point (Tm) is not observed in the temperature range of Tg of 3/2. With respect to the relationship between Tg and Tm, for example, it is possible to refer to OKUI Tokumasa "correlation between polymer crystallization and various transition temperatures" Polymer process (2001) pages 6 to 12 (486 to 492). In order to determine that a melting point exists, it is required to observe a meaningful change (for example, a change which is the same or greater than Tg), not a minute change at a position of the melting point in the DSC measurement.

The multibranched polymer according to the invention further has a core portion and at least three polymeric arm portions that bond to the core portion. This core portion is preferably an atom group having a molecular weight of 200 or greater, and more preferably an atom group having a molecular weight of 300 or greater. The upper limit is preferably 5,000 or less, more preferably 4,000 or less, and particularly preferably 3,000 or less. It is preferable that this core is not formed with tetravalent carbon atoms only. The core portion is preferably a linking group expressed by $L(S)_n$ of Formula (1) below. The arm portion is preferably $P^1$ of Formula (1) below.

The multibranched polymer preferably consists of the compound expressed by Formula (1) below.

$$L\text{-}(\text{S—}P^1)_n \quad (1)$$

In the formula, L represents a trivalent or higher polyvalent linking group. It is practical that the valence of L is octavalent or lower.

$P^1$ represents a polymer chain. n represents an integer of 3 or greater. n items of $P^1$'s may be identical or different from each other. $P^1$ forms an arm portion.

Core Portion

The core portion preferably contains a sulfur atom in the core portion of the multibranched polymer, and preferably has a sulfur atom at a linking position to the arm portion (a position directly connected to the arm portion). The core portion more preferably has a linking group of Formula (1a) below.

$$\text{—}(CR^f_2)_n\text{—O(C=O)—}(CR^f_2)_n\text{—S—} \quad (1a)$$

In the formula, n represents an integer of 0 to 10. $R^f$ is a hydrogen atom or a substituent. Examples of the substituent include a halogen atom (a fluorine atom, a chlorine atom, an iodine atom, and a bromine atom), an alkyl group (preferably having 1 to 12 carbon atoms, more preferably having 1 to 6 carbon atoms, and particularly preferably having 1 to 3 carbon atoms), an alkoxy group (preferably having 1 to 12 carbon atoms, more preferably having 1 to 6 carbon atoms, and particularly preferably having 1 to 3 carbon atoms), an acyl group (preferably having 2 to 12 carbon atoms, more preferably having 2 to 6 carbon atoms, and particularly preferably having 2 to 3 carbon atoms), an aryl group (preferably having 6 to 22 carbon atoms and more preferably having 6 to 10 carbon atoms), an alkenyl group (preferably having 2 to 12 carbon atoms and more preferably having 2 to 5 carbon atoms), a hydroxy group, a nitro group, a cyano group, a thiol group, an amino group, an amide group, an acidic group (a carboxyl group, a phosphoric acid group, a sulfonic acid group, and the like) (this substituent group is called a substituent T). An acidic group may be salts thereof. Examples of a counter ion include an alkali metal ion, an alkali earth metal ion, an ammonium ion, and an alkyl ammonium ion.

The multibranched polymer is preferably expressed by Formula (2) below.

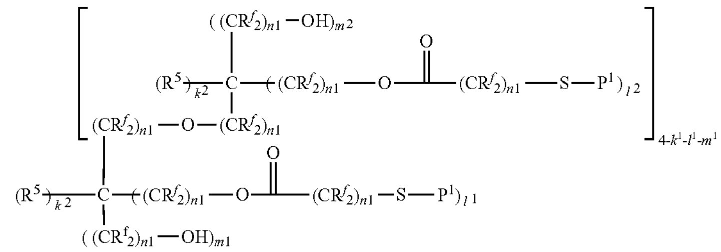

(2)

In the formula, $R^5$ represents a hydrogen atom or a substituent (for example, a substituent T). Among these, $R^5$ represents a hydrogen atom, a halogen atom, a substituted or unsubstituted alkyl group (preferably having 1 to 12 carbon atoms, more preferably having 1 to 6 carbon atoms, particularly preferably having 1 to 3 carbon atoms), a substituted or unsubstituted alkoxy group (preferably having 1 to 12 carbon atoms, more preferably having 1 to 6 carbon atoms, and particularly preferably having 1 to 3 carbon atoms), and a substituted or unsubstituted aryl group (preferably having 6 to 22 carbon atoms and more preferably having 6 to 14 carbon atoms). Examples of the substituent that the alkyl group, the alkoxy group, or the aryl group may have include the substituent T. Among these, a hydroxy group is preferable. The alkyl group may be provided via an oxygen atom, and may be, for example, an oligo oxyalkylene group. The oligo alkylene group is preferably expressed by Formula (OA) below. Examples of the alkyl group having a halogen atom include a fluoroalkyl group.

$R^f$ and $P^1$ have the same meaning as those in Formulae (1a) and (1).

Each of n1's independently represents an integer of 0 to 10, preferably an integer of 0 to 8, and more preferably an integer of 0 to 6.

$k^1$ represents an integer of 0 to 3 and preferably an integer of 0 to 2.

$l^1$ represents an integer of 0 to 4, preferably 1 to 4, and more preferably 2 to 4.

$m^1$ represents an integer of 0 to 3, preferably an integer of 0 to 2, and more preferably an integer of 0 to 1.

$k^2$ represents an integer of 0 to 3, preferably an integer of 0 to 2, and more preferably an integer of 0 to 1.

$l^2$ represents an integer of 0 to 3, preferably an integer of 1 to 3, and more preferably an integer of 2 to 3.

$m^2$ represents an integer of 0 to 3, preferably an integer of 0 to 2, and more preferably an integer of 0 to 1.

Here, the sum of $k^1$, $l^1$, and $m^1$ is 4 or less. The sum of $k^2$, $l^2$, and $m^2$ is 3 or less. The number of groups having $P^1$ is 3 or greater, more preferably 4 or greater. That is, $l^1+l^2\times(4-k^1-l^1-m^1)$ is 3 or greater and preferably 4 or greater. The upper limit is preferably 8 or less and more preferably 6 or less. It is preferable that this —SH forms a linking portion with the arm portion, and it is preferable that the core portion and the arm portion are linked to each other via —S—.

Hereinafter, specific examples of the compound (base material) that forms the core portion are provided, but the compound that can be employed in the invention is not limited to these specific examples. If the hydrogen atom of SH of this formula becomes $P^1$ or a group including $P^1$, the compound becomes the compound of Formula (1) or (2).

A-1

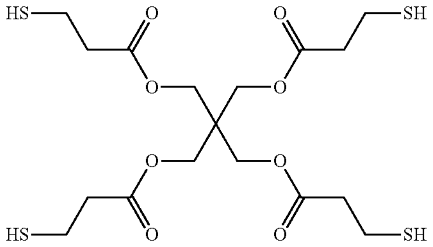

A-2

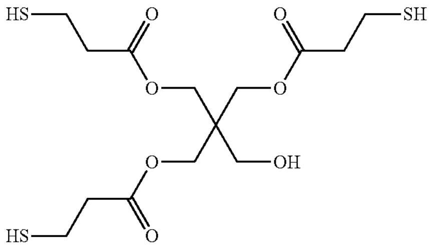

A-3

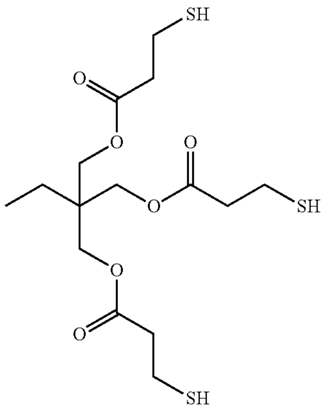

-continued

A-4

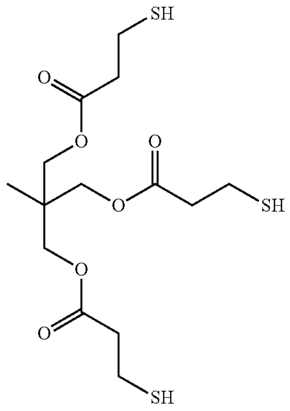

A-5

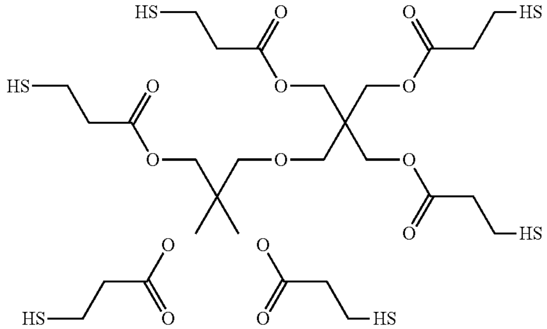

A-6

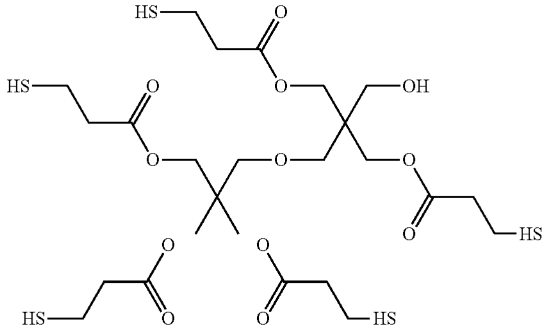

A-7

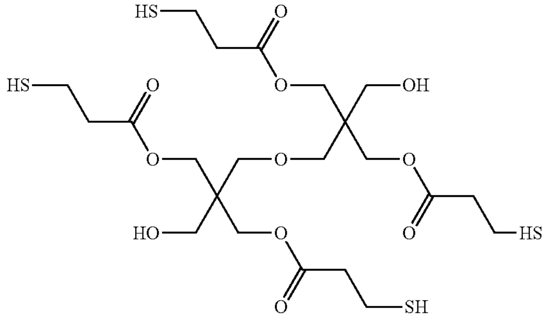

-continued

A-8

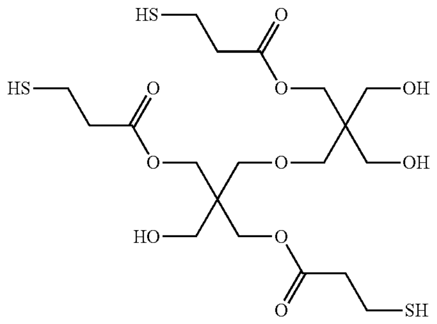

A-9

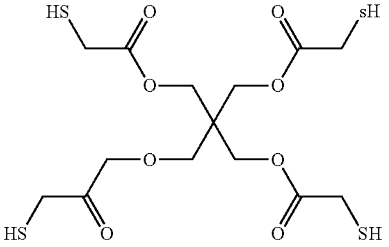

The base material forming the core portion of the multibranched polymer is preferably expressed by any one of Formulae (3) to (8) below.

(3)

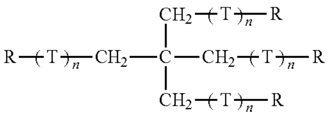

(4)

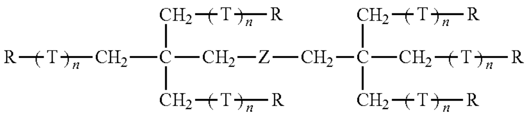

(5)

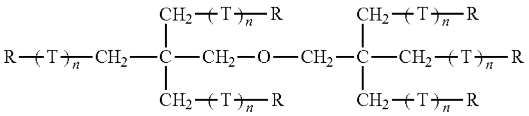

(6)

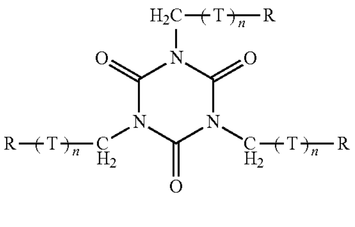

(7)

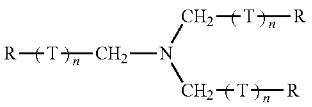

-continued (8)

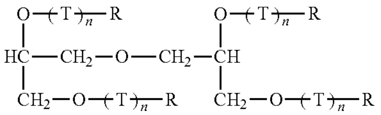

In the formula, R is SH, a hydroxy group, or an alkyl group (preferably having 1 to 3 carbon atoms). Here, the molecule has 3 or more SH's. T is a linking group, and is preferably any one of T1 to T5 below or a linking group relating to the combination thereof. Z is a linking group and is preferably Z1 or Z2 below. The orientation of T1 to T5 may be reversed according to the formula.

(T1)

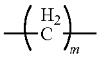

(T2)

$—OCH_2—$ (T3)

$—OCH_2CH_2—$ (T4)

$—OCH_2CH_2CH_2—$ (T5)

$—OCH_2CH_2CH_2CH_2—$ (Z1)

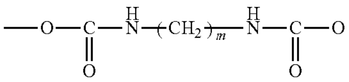

(Z2)

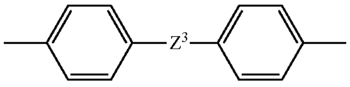

In the formula, n is an integer, each of n's is preferably an integer of 0 to 14, more preferably an integer of 0 to 5, and particularly preferably an integer of 1 to 3. Each of m's is an integer of 1 to 8, more preferably an integer of 1 to 5, and particularly preferably an integer of 1 to 3. Respective R's and T's which are plural in one molecule may be identical to each other or different from each other. In a case where T is an oxyalkylene group, a terminal on the carbon atom side is preferably bonded to R. $Z^3$ is a linking group and preferably an alkylene group having 1 to 12 carbon atoms and more preferably an alkylene group having 1 to 6 carbon atoms. Among them, a 2,2-propanediyl group is particularly preferable.

Arm Portion

The multibranched polymer used in the invention has an arm portion. The structure of the arm portion is preferably a structure having a polyethylene chain as a main chain. Examples of the side chain include $-L^1-R^1$ of Formula (II) below. The molecular weight of the arm portion is preferably 500 or greater and more preferably 1,000 or greater. The upper limit thereof is preferably 1,000,000 or less and more preferably 500,000 or less.

As the monomer that can form the arm portion, monomers disclosed in Polymer Handbook 2nd ed., J. Brandrup, Wiley Interscience (1975) Chapter 2, Pages 1 to 483 can be used.

Specific examples thereof include compounds having one addition polymerizable unsaturated bond selected from styrene derivatives, 1-vinyl naphthalene, 2-vinyl naphthalene, vinyl carbazole, an acrylic acid, a methacrylic acid, (meth) acrylic acid esters, (meth)acrylamides, an allyl compound, vinyl ethers, vinyl esters, and dialkyl itaconates.

Examples of the styrene derivative include styrene, vinyl naphthalene, 2,4,6-tribromostyrene, 2-phenylstyrene, and 4-chlorostyrene.

Examples of the (meth)acrylic acid esters include (meth) acrylic acid esters having a straight chain, branched, or cyclic alkyl group having 1 to 30 carbon atoms, (meth) acrylic acid esters having another functional group such as 2-hydroxyethyl acrylate or trimethylolpropane monoacrylate, (meth)acrylic acid esters having an aryl group such as benzyl (meth)acrylate or methoxybenzyl (meth)acrylate, and (meth)acrylic acid esters having a hetero ring such as furfuryl acrylate, and tetrahydrofurfuryl acrylate.

Examples of the (meth)acrylamides include (meth)acrylamide, N-alkyl(meth)acrylamide (examples of the alkyl group include alkyl groups having 1 to 30 carbon atoms, for example, a methyl group, an ethyl group, and a propyl group), N,N-dialkyl(meth)acrylamide (examples of the alkyl group include alkyl groups having 1 to carbon atoms), N-hydroxyethyl-N-methyl(meth)acrylamide, and N-2-acetamidoethyl-N-acetyl(meth)acrylamide.

Examples of the allyl compound include allyl esters (for example, allyl acetate, allyl caproate, allyl caprylate, allyl laurate, allyl palmitate, allyl stearate, allyl benzoate, allyl acetoacetate, and allyl lactate), and allyloxyethanol.

Examples of the vinyl ethers include alkyl vinyl ether (examples of the alkyl group include alkyl groups having 1 to 10 carbon atoms), for example, hexyl vinyl ether, octyl vinyl ether, decyl vinyl ether, ethylhexyl vinyl ether, methoxyethyl vinyl ether, ethoxyethyl vinyl ether, chloroethyl vinyl ether, 1-methyl-2,2-dimethylpropyl vinyl ether, 2-ethylbutyl vinyl ether, hydroxyethyl vinyl ether, diethylene glycol vinyl ether, dimethylaminoethyl vinyl ether, diethylaminoethyl vinyl ether, butylaminoethyl vinyl ether, benzyl vinyl ether, and tetrahydrofurtryl vinyl ether.

Examples of the vinyl esters include vinyl butyrate, vinyl isobutyrate, vinyl trimethyl acetate, vinyl diethyl acetate, vinyl valerate, vinyl caproate, vinyl chloroacetate, vinyl dichloro acetate, vinyl methoxyacetate, vinyl butoxyacetate, vinyl lactate, vinyl-β-phenyl butyrate, and vinyl cyclohexyl carboxylate.

Examples of the dialkyl itaconates include dimethyl itaconate, diethyl itaconate, and dibutyl itaconate.

Examples of the dialkyl itaconates also include a crotonic acid, an itaconic acid, an acrylonitrile, methacrylonitrile, and maleonitrile.

The arm portion preferably has a structure of containing at least one repeating unit expressed by Formula (I) below. A terminal of the arm portion may have an arbitrary structure, and examples thereof include a hydrogen atom, a methyl group, and a residue of a polymerization terminator.

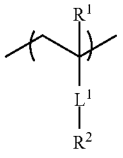
(I)

In the formula, $R^1$ represents a hydrogen atom, a halogen atom, a cyano group, a substituted or unsubstituted alkyl group (preferably having 1 to 12 carbon atoms, more preferably having 1 to 6 carbon atoms, and particularly preferably having 1 to 3 carbon atoms), a substituted or unsubstituted alkoxy group (preferably having 1 to 12 carbon atoms, more preferably having 1 to 6 carbon atoms, and particularly preferably having 1 to 3 carbon atoms), and a substituted or unsubstituted aryl group (preferably having 6 to 22 carbon atoms and more preferably having 6 to 10 carbon atoms). Examples of the arbitrary substituent include the substituent T.

$R^2$ represents a hydrogen atom, an alkyl group (preferably having 1 to 12 carbon atoms, more preferably having 1 to 6 carbon atoms, and particularly preferably having 1 to 3 carbon atoms), an alkenyl group (preferably having 2 to 13 carbon atoms, more preferably having 2 to 7 carbon atoms, and particularly preferably having 2 to 4 carbon atoms), and an aryl group (preferably having 6 to 22 carbon atoms and more preferably having 6 to 10 carbon atoms). It is preferable that $R^2$ represents a straight chain or branched alkyl group having 1 to 30 carbon atoms. When $R^2$ is an alkyl group, an alkenyl group, and an aryl group, $R^2$ may further have the substituent T. Among these, it is preferable to have any one of the functional groups A to D below, and it is more preferable to have the functional group B or C. It is even more preferable that examples of $R^2$ include an alkyl group having the functional group B and an aryl group having the functional group C.

Functional group A: a halogen atom, a cyano group, an acidic group, a hydroxy group, an amino group ($NR^N{}_2$), or an amide group ($CONR^N{}_2$)

Functional group B: a halogen atom, a cyano group, an acidic group, or a hydroxy group Functional group C: a cyano group, an acidic group, or a hydroxy group Functional group D: an acidic group or a hydroxy group Acidic group: a carboxyl group or salts thereof, a phosphoric acid group or salts thereof, a phosphonic acid group or salts thereof, and a sulfonic acid group or salts thereof $R^2$ above is preferably a group having any one of the functional groups A to D and more preferably a group having the functional group D.

$L^1$ represents a single bond or a bivalent linking group. $L^1$ is even more preferably a single bond, or a bivalent linking group selected from —CO—, —O—, —$NR^N$— ($R^N$ represents a hydrogen atom, an alkyl group having 1 to 6 carbon atoms (preferably having 1 to 4 carbon atoms), or an aryl group having 6 to 14 carbon atoms), —COO—, —OCO—, —OCOO—, —$CONR^N$—, an arylene group (preferably having 6 to 22 carbon atoms and more preferably having 6 to 14 carbon atoms), an alkylene group (preferably having 1 to 12 carbon atoms, more preferably having 1 to 6 carbon atoms, and particularly preferably having 1 to 3 carbon atoms), or a combination thereof. Among these, —COO— and —OCO— are preferable. When $L^1$ is an alkylene group, $L^1$ may be an oligo alkylene group with an oxygen atom interposed therebetween. Examples thereof include a group having an oligo oxyalkylene group having a specific number of repetitions (preferably having 1 to 12 carbon atoms, more preferably having 1 to 6 carbon atoms, and particularly preferably having 1 to 3 carbon atoms). As the oligo oxyalkylene group, a group expressed by Formula (OA) below is preferable.

$$*\text{-}[L^R\text{-}O]_{mR}\text{-}L^R\text{-}* \quad \text{(OA)}$$

$L^R$ represents an alkylene group (preferably having 1 to 12 carbon atoms, more preferably having 1 to 6 carbon atoms, and particularly preferably having 1 to 3 carbon atoms). $L^R$ may have an arbitrary substituent T. mR is preferably an integer of 1 to 1,000, more preferably an integer of 1 to 100, even more preferably an integer of 1 to 30, and particularly preferably an integer of 1 to 10. * represents a bonding position. As the linking group having an oligo alkylene group formed with $L^1$, Formula OA1 below is particularly preferable.

$$*{-}CO{-}O{-}[L^R{-}O]_{mR}{-}L^R{-}* \quad \text{(OA1)}$$

The copolymerization ratio of the repeating unit expressed by Formula (I) and other repeating units is not particularly limited, but the proportion of the repeating unit expressed by Formula (I) is preferably 5% or greater, more preferably 10% or greater, and particularly preferably 20% or greater in terms of a molar ratio. The upper limit thereof is not particularly limited, and may be 100% or less. Examples of the other repeating units for copolymerization include repeating units disclosed in Polymer Handbook 2nd ed., J. Brandrup, Wiley Interscience (1975) Chapter 2, Pages 1 to 483.

In a case of a polymer chain having a repeating unit with any one of the functional groups A to D, the existence amount thereof may a predetermined amount, and the copolymerization ratio can be suitably adjusted, as requested. According to the invention, in view of adhesiveness with the inorganic solid electrolyte, the content of the repeating unit having any one of the functional groups A to D is preferably 0.1% or greater, more preferably 0.4% or greater, and particularly preferably 0.5% or greater in terms of the molar ratio in the molecule. The upper limit is preferably 40% or less, more preferably 35% or less, and particularly preferably 30% or less. Examples of the other repeating unit include a constituent unit derived from an acryl monomer with a repeating structure not having the functional groups A to D (for example, an alkyl acrylate constituent unit). The copolymerization ratio of the other repeating unit is preferably 50% or greater, more preferably 55% or greater, and particularly preferably 60% or greater in terms of the molar ratio in the molecule. When the repeating unit is a copolymer, the upper limit thereof is less than 100%, more preferably 99% or less, and particularly preferably 98% or less.

In the preferred embodiment of the invention, as described above, if the repeating unit is caused to be a polymer compound which has a structure having a specific functional group and of which the amount is regulated to a specific range, it is preferable since it is possible to cause the all-solid-state secondary battery to exhibit more favorable performance.

Examples of the polymer compound having a repeating unit with any one of the functional groups A to D and the other repeating units are provided as formulae of the respective repeating units. Formula I-1 is a formula of a repeating unit having any one of the functional groups A to D and Formula I-2 is a formula of a repeating unit not having the functional groups.

(I-1)

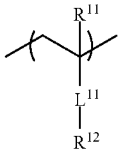

(I-2)

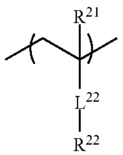

$L^{11}$ and $L^{22}$ have the same meaning as $L^1$. $R^{11}$ and $R^{12}$ have the same meaning as $R^1$.

$R^{12}$ is preferably a group having any one of the functional groups A to D. When the repeating unit is a repeating unit derived from an acrylic acid, $L^{11}$ may be considered as a single bond and $R^{12}$ may be considered as a carboxyl group.

$R^{22}$ is preferably a group having none of the functional groups A to D. Among these, $R^{22}$ preferably represents an alkyl group (preferably having 1 to 24 carbon atoms, more preferably having 3 to 18 carbon atoms, and particularly preferably having 6 to 12 carbon atoms), an alkenyl group (preferably having 2 to 24 carbon atoms, more preferably having 3 to 18 carbon atoms, and particularly preferably having 6 to 12 carbon atoms), and an aryl group (preferably having 6 to 22 carbon atoms and more preferably having 6 to 10 carbon atoms).

In the specification, the expression "acryl" widely refers to a structure group having an acryloyl group and is, for example, a group including a structure having a substituent at an a position. Here, acryl having a methyl group at an a position is called methacryl and may be called (meth)acryl as a meaning of including this methyl group.

Molecular Weight

The molecular weight of the multibranched polymer is not particularly limited, but the molecular weight is preferably 1,700 or greater, more preferably 2,000 or greater, and particularly preferably 3,500 or greater. The upper limit may be 3,000,000 or less, more preferably 1,500,000 or less, even more preferably 1,000,000 or less, even more preferably 500,000 or less, and particularly preferably 100,000 or less.

According to the invention, the molecular weight of the polymer refers to a weight average molecular weight, unless described otherwise. The weight average molecular weight in terms of standard polystyrene is calculated by the gel permeation chromatography (GPC). Basically, the molecular weight is a value measured by methods in Condition 1 or 2 (Priority) below, as the measurement method. Here, according to the type of the polymer, an appropriate eluent may be suitably selected to be used.

(Condition 1)

Column: TOSOH TSKgel Super AWM-H is connected.

Carrier: 10 mM of LiBr/N-methylpyrrolidone (Condition 2) . . . . Priority

Column: a column connected to TOSOH TSKgel Super HZM-H, TOSOH TSKgel Super HZ4000, and TOSOH TSKgel Super HZ2000 is used Carrier: Tetrahydrofuran Glass Transition Point The glass transition point of the multibranched polymer is not particularly limited, but the upper limit may be 100° C. or less, more preferably 80° C. or less, even more preferably 60° C. or less, even more preferably 40° C. or less, and particularly preferably 25° C. or less. It is practical that the lower limit is −200° C. or greater. If the glass transition point is caused to be in the range above, it is preferable that it is possible to suitably promote softening of the binder and obtain favorable adhesiveness. Unless described otherwise, the method for measuring the glass transition point follows the condition measured in the following examples.

It is preferable that the multibranched polymer has a particle shape. It is preferable that the multibranched polymer is dispersed in the dispersion medium and the average particle diameter thereof is 1 nm or greater. The average particle diameter is more preferably 5 nm or greater and particularly preferably 12 nm or greater. The upper limit is preferably 1,000 nm or less, more preferably 500 nm or less, even more preferably 300 nm or less, and particularly preferably 100 nm or less. If the average particle diameter of the multibranched polymer is caused to be in the range above, it is possible to realize favorable binding properties and ion conductivity. The method of measuring the average particle diameter follows the method employed in examples described below.

<Method of Synthesizing Multibranched Polymer>

The method of synthesizing the multibranched polymer may be a method of linking the synthesized arm portion polymer to at least a trifunctional or greater core portion. The method may be a method for sequentially or successively performing polymerization from the trifunctional or greater core portion and forming the arm portion polymer. Examples thereof include a method of performing radical polymerization by using a chain transfer agent. Examples of the chain transfer agent include a thiol-containing compound, and a method of performing radical polymerization in the presence of at least the trifunctional or greater thiol-containing compound is simple in process and thus preferable. In this manner, in a case where the arm portion and the core portion are linked by using ene-thiol reaction, a thiol group may exist on the base material side of the core portion or a thiol group may exist on the base material side of the arm portion. According to the invention, if necessary, it is determined that a thiol group exists on the base material side of the core portion, for a specific convenience.

The multibranched polymer is preferably 0.1 parts by mass or greater, more preferably 0.5 parts by mass or greater, and particularly preferably 1 part by mass or greater with respect to 100 parts by mass of the inorganic solid electrolyte (in a case where an active substance is included, the total amount including this active substance). The upper limit is preferably 50 parts by mass or less, more preferably 30 parts by mass or less, and particularly preferably 10 parts by mass or less.

The multibranched polymer in the composition is preferably 0.1 mass % or greater, more preferably 0.5 mass % or greater, and particularly preferably 1 mass % or greater. The upper limit is preferably 30 mass % or less, more preferably 10 mass % or less, and particularly preferably 5 mass % or less.

The multibranched polymers may be used singly or two or more types thereof may be used in combination.

In this specification, in addition to options of the substituent or the linking group of the compound, the technical items such as temperatures and thicknesses may be described in independent lists or may be described in combination.

According to the invention, it is possible to prevent the electrode flexibility and the resistance increase of the interface resistance by employing the multibranched polymer. It is assumed or considered that the reason is as follows. That is, due to the introduction of the branched structure, the multibranched polymer has small in the spread of the molecule chain in a single molecule and is hardly entangled with other molecules. Meanwhile, if the multibranched polymer is the straight chain polymer, the multibranched polymer easily entangled with other molecules and a large size of the binding point easily increases by a drying process or the like. It is interpreted that, due to this difference, ion conductivity is improved while favorable flexibility and binding properties can be maintained, by employing the multibranched polymer according to the invention. Among these, as described above, it is preferable to have an acidic group or the like in the arm portion thereof in the relation with the inorganic solid electrolyte.

Polymerization Initiator

It is preferable to include the polymerization initiator in the synthesization of the polymer compound that forms the binder of the invention. Among these, examples thereof include the blending of the radical polymerization initiator.

Examples of the thermal radical polymerization initiator that is cleaved by heat and generates initial radicals include ketone peroxides such as methyl ethyl ketone peroxide, methyl isobutyl ketone peroxide, acetyl acetone peroxide, cyclohexanone peroxide, and methyl cyclohexanone peroxide; hydroperoxides such as 1,1,3,3-tetramethylbutyl hydroperoxide, cumene hydroperoxide, and t-butylhydroperoxide; diacyl peroxides such as diisobutyryl peroxide, bis-3,5,5-trimethylhexanoyl peroxide, lauroyl peroxide, benzoyl peroxide, and m-toluylbenzoyl peroxide; dialkyl peroxides such as dicumyl peroxide, 2,5-dimethyl-2,5-di(t-butyl peroxy)hexane, 1,3-bis(t-butyl peroxyisopropyl) hexane, t-butylcumyl peroxide, di-t-butyl peroxide, and 2,5-dimethyl-2,5-di(t-butyl peroxy)hexene; peroxyketals such as 1,1-di(t-butyl peroxy-3,5,5-trimethyl)cyclohexane, 1,1-di-t-butyl peroxycyclohexane, and 2,2-di(t-butyl peroxy) butane; alkyl peresters such as t-hexyl peroxypivalate, t-butyl peroxypivalate, 1,1,3,3-tetramethylbutyl peroxy-2-ethyl hexanoate, t-amyl peroxy-2-ethyl hexanoate, t-butyl peroxy-2-ethyl hexanoate, t-butyl peroxy isobutyrate, di-t-butyl peroxy hexahydro terephthalate, 1,1,3,3-tetramethylbutyl peroxy-3,5,5-trimethyl hexanoate, t-amyl peroxy-3,5,5-trimethyl hexanoate, t-butyl peroxy-3,5,5-trimethyl hexanoate, t-butyl peroxyacetate, t-butyl peroxybenzoate, and dibutyl peroxytrimethyladipate; peroxycarbonates such as 1,1,3,3-tetramethylbutyl peroxyneodicarbonate, α-cumyl peroxyneodicarbonate, t-butyl peroxyneodicarbonate, di-3-methoxybutyl peroxydicarbonate, di-2-ethylhexyl peroxydicarbonate, bis(1,1-butylcyclohexaoxydicarbonate), diisopropyloxydicarbonate, t-amyl peroxyisopropylcarbonate, t-butyl peroxyisopropylcarbonate, t-butyl peroxy-2-ethylhexylcarbonate, and 1,6-bis(t-butyl peroxycarboxy)hexane; and 1,1-bis(t-hexyl peroxy)cyclohexane and (4-t-butylcyclohexyl) peroxydicarbonate.

Specific examples of the azo compound used as the azo-based polymerization initiator (AIBN or the like) include 2,2'-azobisisobutyronitrile, 2,2'-azobis(2-methylbutyronitrile), 2,2'-azobis(2,4-dimethylvaleronitrile), 1,1'-azobis-1-cyclohexanecarbonitrile, dimethyl-2,2'-azobisisobutyrate, 4,4'-azobis-4-cyanovaleric acid, 2,2'-azobis-(2-amidinopropane) dihydrochloride (see JP2010-189471A or the like). Otherwise, dimethyl-2,2'-azobis(2-methylpropionate) (Product name V-601, manufactured by Wako Pure Chemical Industries, Ltd.) or the like can be suitably used.

In addition to the thermal radical polymerization initiator above, a radical polymerization initiator that generates initial radicals with light, electron beams, or radiation can be used as the radical polymerization initiator.

Examples of this radical polymerization initiator include benzoin ether, 2,2-dimethoxy-1,2-diphenylethan-1-one [IRGACURE 651, manufactured by Ciba Specialty Chemicals Inc., Trademark], 1-hydroxy-cyclohexyl-phenyl-ketone [IRGACURE 184, manufactured by Ciba Specialty Chemicals Inc., Trademark], 2-hydroxy-2-methyl-1-phenyl-propan-1-one [DAROCUR 1173, manufactured by Ciba Specialty Chemicals Inc., Trademark], 1-[4-(2-hydroxyethoxy)-phenyl]-2-hydroxy-2-methyl-1-propan-1-one [IRGACURE 2959, manufactured by Ciba Specialty Chemicals Inc., Trademark], 2-hydroxy-1-[4-[4-(2-hydroxy-2-methyl-propionyl)-benzyl]phenyl]-2-methyl-propan-1-one [IRGACURE 127, manufactured by Ciba Specialty Chemicals Inc., Trademark], 2-methyl-1-(4-methylthiophenyl)-2-morpholinopropan-1-one [IRGACURE 907, manufactured by Ciba Specialty Chemicals Inc., Trademark], 2-benzyl-2-dimethylamino-1-(4-morpholinophenyl)-butanone-1 [IRGACURE 369, manufactured by Ciba Specialty Chemicals Inc., Trademark], 2-(dimethylamino)-2-[(4-methylphenyl) methyl]-1-[4-(4-morpholinyl)phenyl]-1-butanone[IRG ACURE 379, manufactured by Ciba Specialty Chemicals Inc., Trademark], 2,4,6-trimethylbenzoyl-diphenyl-phosphine oxide [DAROCUR TPO, manufactured by Ciba Specialty Chemicals Inc., Trademark], bis(2,4,6-trimethylbenzoyl)-phenylphosphine oxide [IRGACURE 819, manufactured by Ciba Specialty Chemicals Inc., Trademark], bis($\eta^5$-2,4-cyclopentadiene-1-yl)-bis(2,6-difluoro-3-(1H-pyrrole-1-yl)-phenyl)titanium [IRGACURE 784, manufactured by Ciba Specialty Chemicals Inc., Trademark], 1,2-octanedione, 1-[4-(phenylthio)-, 2-(O-benzoyloxime)] [IRGACURE OXE 01, manufactured by Ciba Specialty Chemicals Inc., Trademark], and ethanone, 1-[9-ethyl-6-(2-methylbenzoyl)-9H-carbazol-3-yl]-, 1-(O-acetyloxime) [IRGACURE OXE 02, manufactured by Ciba Specialty Chemicals Inc., Trademark].

These radical polymerization initiators may be used singly and two or more types thereof may be used in combination.

The polymerization initiator is preferably applied in the amount in which the content is 0.01 parts by mass to 20 parts by mass with respect to 100 parts by mass of the monomer.

Polymerization Inhibitor

In the synthesization of the polymer compound that forms the binder, a polymerization inhibitor may be added. As the polymerization inhibitor, for example, phenols such as hydroquinone, tert-butylhydroquinone, catechol, and hydroquinone monomethyl ether; quinones such as benzoquinone, and diphenylbenzoquinone; phenothiazines; coppers; and 2,2,6,6-tetramethylpiperidine 1-oxyl.

In the synthesization of the polymer compound that forms the binder, a reaction medium may be used. Examples of a suitably used medium include an aliphatic compound solvent, an ether-based solvent, ester-based solvent, and a ketone-based solvent, the medium is not particularly limited, and toluene, n-heptane, n-hexane, cyclohexane, cyclopentane, octane, decane, dibutyl ether, diisopropyl ether, t-butylmethyl ether, cyclohexylmethyl ether, methyl acetate, ethyl acetate, acetone, methyl ethyl ketone, and cyclohexanone can be used.

The temperature of the polymerization reaction is not particularly limited, and may be adjusted depending on the monomer or the reaction medium to be applied, but, for example, the temperature is preferably 40° C. or greater, more preferably 50° C. or greater, and particularly preferably 60° C. or greater. The upper limit is not particularly limited, but it is practical that the upper limit is 150° C. or less.

(Dispersion Medium)

In the solid electrolyte composition according to the invention, a dispersion medium in which respective components are dispersed may be used. Specific examples of the dispersion medium include the followings.

Examples of an alcohol compound solvent include methylalcohol, ethylalcohol, 1-propylalcohol, 2-propylalcohol, 2-butanol, ethylene glycol, propylene glycol, glycerin, 1,6-hexanediol, cyclohexanediol, sorbitol, xylitol, 2-methyl-2, 4-pentanediol, 1,3-butanediol, and 1,4-butanediol.

Examples of the ether compound solvent include alkylene glycol alkyl ether (ethylene glycol monomethyl ether, ethylene glycol monobutyl ether, diethylene glycol, dipropylene glycol, propylene glycol monomethyl ether, diethylene glycol monomethyl ether, triethylene glycol, dipropylene glycol monomethyl ether, tripropylene glycol monomethyl ether, diethylene glycol monobutyl ether, or the like), dimethyl ether, diethyl ether, tetrahydrofuran, cyclopentyl methyl ether, dimethoxyethane, and 1,4-dioxane.

Examples of the amide compound solvent include N,N-dimethylformamide, N-methyl-2-pyrrolidone, N-ethyl-2-pyrrolidone, 2-pyrrolidinone, 1,3-dimethyl-2-imidazolidinone, s-caprolactam, formamide, N-methylformamide, acetamide, N-methylacetamide, N,N-dimethylacetamide, N-methylpropionamide, and hexamethylphosphoric triamide.

Examples of the ketone compound solvent include acetone, methyl ethyl ketone, methylisobutylketone, diethylketone, dipropylketone, diisopropylketone, diisobutylketone, and cyclohexanone.

Examples of the aromatic compound solvent include benzene, toluene, xylene, chlorobenzene, and dichlorobenzene.

Examples of the aliphatic compound solvent include hexane, heptane, octane, decane, and dodecane.

Examples of the nitrile compound solvent include acetonitrile, propionitrile, butyronitrile, isobutyronitrile, and benzonitrile.

According to the invention, among them, an ether compound solvent, a ketone compound solvent, an aromatic compound solvent, or an aliphatic compound solvent is preferably used, and an ether compound solvent, a ketone compound solvent, or an aliphatic compound solvent is more preferably used. A boiling point of the dispersion medium at normal pressure (1 atmosphere) is preferably 50° C. or higher and more preferably 80° C. or higher. The upper limit is preferably 220° C. or lower, and still more preferably 180° C. or lower. The dispersion medium may be used singly or two or more types thereof may be used in combination.

According to the invention, the amount of the dispersion medium in the solid electrolyte composition may be an arbitrary amount for the balance between the viscosity and the drying load of the solid electrolyte composition. Generally, in the solid electrolyte composition, the amount of the dispersion medium is preferably 20 mass % to 99 mass %.

(Positive Electrode Active Substance)

The positive electrode active substance may be contained in the solid electrolyte composition according to the invention. In this manner, a composition for a positive electrode material can be made. Transition metal oxide is preferably used in the positive electrode active substance. Among them, transition metal oxide having a transition element $M^a$ (1 type or more elements selected from Co, Ni, Fe, Mn, Cu, and V) is preferable. A mixed element $M^b$ (an element in Group 1 (Ia) of the periodic table of metal other than lithium, an element in Group 2 (IIa), Al, Ga, In, Ge, Sn, Pb, Sb, Bi, Si, P, B, and the like) may be mixed. Examples of this transition metal oxide include a specific transition metal oxide including oxide expressed by any one of Formulae (MA) to (MC) below or include $V_2O_5$ and $MnO_2$, as additional transition metal oxide. A particle-state positive electrode active substance may be used in the positive electrode active substance. Specifically, it is possible to use a transition metal oxide to which a lithium ion can be reversibly inserted or released, but it is preferable to use the specific transition metal oxide described above.

Examples of the transition metal oxide appropriately include oxide including the transition element $M^a$. At this point, the mixed element $M^b$ (preferably Al) and the like are mixed. The mixture amount is preferably 0 mol % to 30 mol % with respect to the amount of the transition metal. It is more preferable that the transition element is synthesized by mixing elements such that the molar ratio of Li/$M^a$ becomes 0.3 to 2.2.

[Transition Metal Oxide Expressed by Formula (MA) (Layered Rock Salt Structure)]

Among them, as the lithium-containing transition metal oxide, metal oxide expressed by the following formula is preferable.

$$Li_aM^1O_b \quad (MA)$$

In the formula, $M^1$ has the same as $M^a$ above, a represents 0 to 1.2 (preferably 0.2 to 1.2) and preferably represents 0.6 to 1.1. b represents 1 to 3, and preferably 2. A portion of $M^1$ may be substituted with the mixed element $M^b$. The transition metal oxide expressed by Formula (MA) above typically has a layered rock salt structure.

The transition metal oxide according to the invention is more preferably expressed by the following formulae.

$$Li_gCoO_k \quad (MA\text{-}1)$$

$$Li_gNiO_k \quad (MA\text{-}2)$$

$$Li_gMnO_k \quad (MA\text{-}3)$$

$$Li_gCo_jNi_{1-j}O_k \quad (MA\text{-}4)$$

$$Li_gNi_jMn_{1-j}O_k \quad (MA\text{-}5)$$

$$Li_gCo_jNi_iAl_{1-j-i}O_k \quad (MA\text{-}6)$$

$$Li_gCo_jNi_iMn_{1-j-i}O_k \quad (MA\text{-}7)$$

Here, g has the same meaning as a above. j represents 0.1 to 0.9. i represents 0 to 1. Here, 1−j−i becomes 0 or greater. k has the same meaning as b above. Specific examples of the transition metal compound include $LiCoO_2$ (lithium cobalt oxide [LCO]), $LiNi_2O_2$ (lithium nickel oxide), $LiNi_{0.85}Co_{0.01}Al_{0.05}O_2$ (lithium nickel cobalt aluminum oxide [NCA]), $LiNi_{0.33}Co_{0.33}Mn_{0.33}O_2$ (lithium nickel manganese cobalt oxide [NMC]), and $LiNi_{0.5}Mn_{0.5}O_2$ (lithium manganese nickel oxide).

Though partially overlapped, if the transition metal oxide expressed by Formula (MA) is indicated by changing the indication, the following are also provided as preferable examples.

$$Li_gNi_xMn_yCo_zO_2 (x>0.2, y>0.2, z\geq 0, \text{ and } x+y+z=1) \quad (i)$$

Representative transition metal oxide thereof:

$Li_gNi_{1/3}Mn_{1/3}Co_{1/3}O_2$ $Li_gNi_{1/2}Mn_{1/2}O_2$ $$Li_gNi_xCo_yAl_zO_2 (x>0.7, y>0.1, 0.1>z\geq 0.05, \text{ and } x+y+z=1) \quad (ii)$$

Representative transition metal oxide thereof:

$Li_gNi_{0.8}Co_{0.15}Al_{0.05}O_2$

[Transition Metal Oxide Expressed by Formula (MB) (Spinel-Type Structure)]

Among them, as the lithium-containing transition metal oxide, transition metal oxide expressed by Formula (MB) below is also preferable.

$$Li_cM^2{}_2O_d \quad (MB)$$

In the formula, $M^2$ has the same meaning as $M^a$ above. c represents 0 to 2 (preferably 0.2 to 2) and preferably represents 0.6 to 1.5. d represents 3 to 5, and preferably represents 4.

The transition metal oxide expressed by Formula (MB) is more preferably transition metal oxide expressed by the following formulae.

$$Li_mMn_2O_n \quad (MB\text{-}1)$$

$$Li_mMn_pAl_{2-p}O_n \quad (MB\text{-}2)$$

$$Li_mMn_pNi_{2-p}O_n \quad (MB\text{-}3)$$

m has the same meaning as c. n has the same meaning as d. p represents 0 to 2. Specific examples of the transition metal compound include $LiMn_2O_4$ and $LiMn_{1.5}Ni_{0.5}O_4$.

The transition metal oxide expressed by Formula (MB) is more preferably transition metal oxide expressed by the following formulae.

$$LiCoMnO_4 \quad (a)$$

$$Li_2FeMn_3O_8 \quad (b)$$

$$Li_2CuMn_3O_8 \quad (c)$$

$$Li_2CrMn_3O_8 \quad (d)$$

$$Li_2NiMn_3O_8 \quad (e)$$

Among the above, in view of high capacity and high output, an electrode including Ni is more preferable.

[Transition Metal Oxide Expressed by Formula (MC)]

As the lithium-containing transition metal oxide, lithium-containing transition metal phosphorus oxide is preferably used. Among them, transition metal oxide expressed by Formula (MC) below is also preferable.

$$Li_eM^3(PO_4)_f \quad (MC)$$

In the formula, e represents 0 to 2 (preferably 0.2 to 2) and preferably 0.5 to 1.5. f represents 1 to 5 and preferably represents 0.5 to 2.

$M^3$ above represents one or more types of elements selected from V, Ti, Cr, Mn, Fe, Co, Ni, and Cu. $M^3$ above may be substituted with other metal such as Ti, Cr, Zn, Zr, and Nb, in addition to the mixed element $M^b$ above. Specific examples thereof include an olivine-type iron phosphate salt such as $LiFePO_4$ and $Li_3Fe_2(PO_4)_3$, iron pyrophosphates such as $LiFeP_2O_7$, cobalt phosphates such as $LiCoPO_4$, and a monoclinic nasicon-type vanadium phosphate salt such as $Li_3V_2(PO_4)_3$ (vanadium lithium phosphate).

The values of a, c, g, m, and e representing the composition of Li are values that are changed depending on charging and discharging, and are typically evaluated by the values in a stable state when Li is contained. In Formulae (a) to (e) above, the composition of Li is indicated with specific values, but this is changed depending on an operation of the battery in the same manner.

In the secondary battery according to the invention, the average particle diameter of the positive electrode active substance used is not particularly limited, but the average particle diameter is preferably 0.1 μm to 50 μm. In order to cause the positive electrode active substance to have a predetermined particle size, a general pulverizer and a general classifier may be used. The positive electrode active substance obtained by the baking method may be used after being washed with water, an acidic aqueous solution, an alkaline aqueous solution, or an organic dissolving agent.

The concentration of the positive electrode active substance is not particularly limited, but the concentration in the solid electrolyte composition is preferably 20 mass % to 90 mass % and more preferably 40 mass % to 80 mass % with respect to 100 mass % of the solid component. The positive electrode active substance may be used singly or two or more types thereof may be used in combination.

(Negative Electrode Active Substance)

The negative electrode active substance may be contained in the solid electrolyte composition according to the invention. In this manner, a composition for the negative electrode material can be made. As the negative electrode active substance, an active substance to which a lithium ion can be reversibly inserted or released is preferable. The material is not particularly limited, and examples thereof include carbonaceous material, metal oxide such as tin oxide and silicon oxide, metal composite oxide, a single substance of lithium, a lithium alloy such as a lithium aluminum alloy, and metal that can form an alloy with lithium such as Sn or Si. Among these, the carbonaceous material or lithium composite oxide is preferably used in view of safety. As the metal composite oxide, metal composite oxide that can occlude or release lithium is preferable. The material thereof is not particularly limited, but a material that contains titanium and/or lithium as the constituent component is preferable in view of charging and discharging characteristics at high current density.

The carbonaceous material used as the negative electrode active substance is a material that is substantially made of carbon. Examples thereof include petroleum pitch, natural graphite, artificial graphite such as vapor phase-grown graphite, and a carbonaceous material obtained by baking various synthetic resins such as a PAN-based resin or a furfuryl alcohol resin. Examples thereof further include various carbon fibers such as a PAN-based carbon fiber, a cellulose-based carbon fiber, a pitch-based carbon fiber, a vapor phase-grown carbon fiber, a dehydrated PVA-based carbon fiber, a lignin carbon fiber, a glass-state carbon fiber, and an active carbon fiber, a mesophase microsphere, a graphite whisker, and a flat plate-shaped graphite.

These carbonaceous materials may be divided into a hardly graphitizable carbon material and a graphite-based carbon material according to the degree of graphitization. The carbonaceous material preferably has surface intervals, density, and sizes of crystallite as disclosed in JP1987-22066A (JP-S62-22066A), JP1990-6856A (JP-H2-6856A), and JP1991-45473A (JP-H3-45473A). The carbonaceous material does not have to be a single material, and a mixture of natural graphite and artificial graphite disclosed in JP1993-90844A (JP-H5-90844A), graphite having a coating layer disclosed in JP1994-4516A (JP-H6-4516A), and the like can be used.

As the metal oxide and the metal composite oxide that are applied as the negative electrode active substance, amorphous oxide is particularly preferable, and, further, chalcogenide which is a reaction product of a metal element and an element in Group 16 in the periodic table can be preferably used. The expression "amorphous" herein means to have a broad scattering band having a vertex in an area of 20° to 40° in 2θ values in the X-ray diffraction method using CuKα rays, and may have crystalline diffraction lines. The strongest strength of the crystalline diffraction lines seen at 40° to 70° in the 2θ values is preferably 100 times or less and more preferably 5 times or less in the diffraction line intensity in the vertex of a broad scattering band seen at 20° to 40° in the 2θ value, and it is particularly preferable that oxide does not have a crystalline diffraction line.

Among the compound groups made of amorphous oxide and chalcogenide, amorphous oxide and chalcogenide of a metalloid element are more preferable, and an element of Groups 13 (IIIB) to 15 (VB) in the periodic table, a single substance of Al, Ga, Si, Sn, Ge, Pb, Sb, or Bi or oxide made of a combination obtained by combining two or more types thereof, and chalcogenide are particularly preferable. Specific examples of preferable amorphous oxide and chalcogenide preferably include $Ga_2O_3$, SiO, GeO, SnO, $SnO_2$, PbO, $PbO_2$, $Pb_2O_3$, $Pb_2O_4$, $Pb_3O_4$, $Sb_2O_3$, $Sb_2O_4$, $Sb_2O_5$, $Bi_2O_3$, $Bi_2O_4$, $SnSiO_3$, GeS, SnS, $SnS_2$, PbS, $PbS_2$, $Sb_2S_3$, $Sb_2S_5$, and $SnSiS_3$. These may be composite oxide with lithium oxide, for example, $Li_2SnO_2$.

The average particle diameter of the negative electrode active substance is preferably 0.1 μm to 60 μm. In order to cause the negative electrode active substance to have a predetermined particle size, a well-known pulverizer and a well-known classifier are used. For example, a mortar, a ball mill, a sand mill, a vibrating ball mill, a satellite ball mill, a planetary ball mill, a swirling air stream-type jet mill, and a sieve are appropriately used. At the time of pulverizing, wet pulverization in which an organic solvent such as water or methanol coexist may be performed, if necessary. In order to obtain a desired particle diameter, classification is preferably performed. A classification method is not particularly limited, and a sieve, an air classifier, or the like can be used, if necessary. As the classification, both dry-type classification and wet-type classification can be used.

The chemical formula of the compound obtained by the baking method can be calculated in an inductive coupling plasma (ICP) emission spectrophotometric analysis method as a measuring method or can be calculated from a mass difference between particles before and after baking, as a simple method.

Examples of the negative electrode active substance that can be used together with an amorphous oxide negative electrode active substance mainly using Sn, Si, and Ge appropriately include a carbon material that can occlude and release lithium ion, lithium metal or lithium, lithium alloy, or metal that can be formed to an alloy with lithium.

The negative electrode active substance preferably contains a titanium atom. More specifically, since the change in the volume of $Li_4Ti_5O_{12}$ is small when a lithium ion is occluded and released, quick charging-discharging properties are excellent, the deterioration of the electrode is prevented, and the lifespan of the lithium ion secondary battery can be improved. Therefore, $Li_4Ti_5O_{12}$ is preferable. Stability of the secondary battery in various use condition improves due to the combination between a specific negative electrode and a further specific electrolyte solution.

In the all-solid-state secondary battery according to the invention, it is preferable to apply the negative electrode active substance that contains an Si element. Generally, the Si negative electrode can occlude Li ions more than the current carbon negative electrode (graphite, acetylene black, or the like). That is, since the Li ion occlude amount increases per weight, it is possible to increase the battery capacity. As a result, there is an advantage of causing the battery driving time to be longer, and thus the usage thereof in a battery for vehicle is expected in the future. Meanwhile, it is known that the volume change accompanied by the occlusion and release of the Li ion is great. For example, when the cubical expansion in the carbon negative electrode is about 1.2 to 1.5 times, the cubical expansion in the Si negative electrode may be about 3 times. If this expansion and contraction is repeated (charging and discharging are repeated), the durability of the electrode layer is insufficient, such that, for example, the contact easily becomes insufficient or the cycle life span (battery life span) becomes short, in some cases.

With the solid electrolyte composition according to the invention, in this electrode layer having great expansion and contraction, high durability (strength) thereof is exhibited, and thus the excellent advantages are exhibited more effectively.

The concentration of the negative electrode active substance is not particularly limited, but the concentration in the solid electrolyte composition is preferably 10 mass % to 80 mass % and more preferably 20 mass % to 70 mass % with respect to 100 mass % of the solid component.

The embodiment above describes an example in which a positive electrode active substance and a negative electrode active substance is contained in the solid electrolyte composition according to the invention, but the invention is not limited to thereto. For example, a paste including a positive electrode active substance and a negative electrode active substance as the binder composition that does not include a multibranched polymer may be prepared. In this manner, the positive electrode material and the negative electrode material which are commonly used are combined, and the solid electrolyte composition relating to the preferable embodiment of the invention may be used to form an inorganic solid electrolyte layer. The conductive assistance may be suitably contained in the active substance layer of the positive electrode and the negative electrode, if necessary. General examples of the electron conductive material include a carbon fiber, such as graphite, carbon black, acetylene black, Ketjen black, and a carbon nanotube, metal powders, a metal fiber, and a polyphenylene derivative.

The negative electrode active substance may be used singly or two or more types thereof may be used in combination.

<Collector (Metallic Foil)>

It is preferable that an electron conductor that does not cause a chemical change is used as the collector of the positive.negative electrodes. As the collector of the positive electrode, in addition to aluminum, stainless steel, nickel, titanium, and the like, a product obtained by treating carbon, nickel, titanium, or silver on the surface of aluminum and stainless steel is preferable. Among them, aluminum and an aluminum alloy are more preferable. As the negative electrode collector, aluminum, copper, stainless steel, nickel, and titanium are preferable, and aluminum, copper, and a copper alloy are more preferable.

As the form of the collector, a film sheet-shaped collector is commonly used, but a net, a punched collector, a lath body, a porous body, a foam body, a molded body of a fiber group, and the like can be used. The thickness of the collector is not particularly limited, but the thickness is preferably 1 μm to 500 μm. Roughness is preferably formed on the collector surface by a surface treatment.

<Manufacturing of all-Solid-State Secondary Battery>

Manufacturing of the all-solid-state secondary battery may be performed by the common method. Specifically, examples of the method include a method of making an electrode sheet for a battery on which a coating film is formed by applying the solid electrolyte composition according to the invention on a metallic foil that becomes a collector.

For example, after the composition that becomes the positive electrode material is applied on the metallic foil which is the positive electrode collector, drying is performed such that the positive electrode active layer is formed. Subsequently, after the solid electrolyte composition is applied on the positive electrode sheet for the battery, drying is performed such that the solid electrolyte layer is formed. After the composition that becomes the negative electrode active material is applied thereon, drying is performed such that the negative electrode layer is formed. Additionally, the structure of the all-solid-state secondary battery in which the solid electrolyte layer is inserted between the positive electrode layer and the negative electrode layer can be obtained by overlapping the collector (metallic foil) on the negative electrode side. The method of applying the respective compositions may be performed in the normal method. At this point, after the composition for making the positive electrode active substance layer, the composition (solid electrolyte composition) for making the inorganic solid electrolyte layer, and the composition for making the negative electrode active substance layer are respectively applied, a drying treatment may be performed, or after the multilayer application is performed, a drying treatment may be performed. The drying temperature is not particularly performed, but the drying temperature is preferably 30° C. or higher and more preferably 60° C. or higher. The upper limit is preferably 300° C. or lower and more preferably 250° C. or lower. If the heating is performed at this temperature range, the dispersion medium is removed, such that the solid electrolyte composition can be caused to be in the solid state. In this manner, in the all-solid-state secondary battery, satisfactory binding properties and ion conductivity in non-pressurization can be obtained.

<Use of all-Solid-State Secondary Battery>

The all-solid-state secondary battery according to the invention can be applied to various uses. The use aspect is not particularly limited, but, in a case where the all-solid-state secondary battery is mounted in an electronic device, examples thereof include a notebook personal computer, a pen input personal computer, a mobile personal computer, an electron book player, a cellular phone, a cordless phone slave unit, a pager, a handy terminal, a portable fax machine, a portable copying machine, a portable printer, a headphone stereo, a video movie, a liquid crystal television, a handy cleaner, a portable CD, a mini disc, an electric shaver, a transceiver, an electronic organizer, a calculator, a portable tape recorder, radio, a backup power supply, and a memory card. Examples of additional consumer use include an automobile, an electric motor vehicle, a motor, lighting equipment, a toy, a game machine, a load conditioner, a clock, a stroboscope, a camera, and medical equipment (a pacemaker, a hearing aid, and a shoulder massager). The all-solid-state secondary battery can be used for military or space. The all-solid-state secondary battery can be combined with a solar battery.

Among these, the all-solid-state secondary battery is preferably applied to an application that requires discharging properties at high capacity and a high rate. For example, in an electric storage facility and the like in which high capacity enhancement is expected in the future, high safety is necessary, and thus compatibility between battery properties is required. A high capacity secondary battery is mounted on an electric car and the like, a use in which charging is performed everyday at home is assumed, and safety at overcharging is further required. According to the invention, an excellent effect can be achieved in response to these use forms.

According to the preferable embodiment of the invention, respective application embodiments as follows are provided.

A solid electrolyte composition (a composition for electrodes of a positive electrode or a negative electrode) that includes an active substance that can insert or release ion of metal belonging to Group 1 or 2 of the periodic table.

An electrode sheet for a battery obtained by forming a film of a solid electrolyte composition on a metallic foil.

An all-solid-state secondary battery including a positive electrode active substance layer, a negative electrode active substance layer, and an inorganic solid electrolyte layer, in which at least one of the positive electrode active substance layer, the negative electrode active substance layer, or the inorganic solid electrolyte layer is a layer formed of a solid electrolyte composition.

A method of manufacturing an electrode sheet for a battery by disposing the solid electrolyte composition on a metallic foil, and forming a film of the solid electrolyte composition.

An all-solid-state secondary battery manufacturing method of manufacturing an all-solid-state secondary battery by the method of manufacturing an electrode sheet for a battery.

The all-solid-state secondary battery refers to a secondary battery that is formed of a positive electrode, a negative electrode, and an electrolyte which are all solid. In other words, the all-solid-state secondary battery is different from an electrolyte solution-type secondary battery in which a carbonate-based solvent is used as an electrolyte. Among these, the invention relates to an inorganic all-solid-state secondary battery. The all-solid-state secondary battery is classified into the organic (high molecular) all-solid-state secondary battery using a polymer compound such as polyethylene oxide as an electrolyte and the inorganic all-solid-state secondary battery using, Li—P—S, LLT, LLZ, or the like. A polymer compound can be applied as binders of the positive electrode active substance, the negative electrode active substance, and the inorganic solid electrolyte particle, without preventing application of the polymer compound to an inorganic all-solid-state secondary battery.

The inorganic solid electrolyte is different from the electrolyte (high molecular electrolyte) using the polymer compound described above, as an ion conducting medium, and the inorganic compound becomes an ion conducting medium. Specific examples thereof include Li—P—S, LLT or LLZ above. The inorganic solid electrolyte itself does not release a positive ion (Li ion), but exhibits an ion transporting function. In contrast, an electrolyte solution or a material that becomes a supply source of an ion that is added to a solid electrolyte layer and releases a positive ion (Li ion) is called an electrolyte, but when the electrolyte is differentiated from the electrolyte as the ion transferring material, the electrolyte is called an "electrolyte salt" or a "supporting electrolyte". Examples of the electrolyte salt include lithium bistrifluoromethanesulfonimide (LiTFSI).

In this specification, the expression "composition" means a mixture in which two or more components are homogeniously mixed. Here, homogeneity may be substantially maintained, and aggregation or uneven distribution may partially occur in a range in which a desired effect is exhibited.

EXAMPLES

Hereinafter, the invention is specifically described with reference to examples, but the invention is not limited thereto. In the examples below, the expressions "part" and "%" are on a mass basis, unless otherwise described.

Synthesization Example of Multibranched Polymer 285.0 g of 2-ethylhexyl methacrylate (manufactured by Wako Pure Chemical Industries, Ltd.), 15.0 g of a methacrylic acid (manufactured by Wako Pure Chemical Industries, Ltd.), 15.0 g of pentaerythritol tetrakis(3-mercaptopropionate) (manufactured by Wako Pure Chemical Industries, Ltd., corresponding to A-1), and 700.0 g of methyl ethyl ketone were added to a 2,000 ml three-necked flask provided with a reflux condenser and a gas introduction cock, nitrogen substitution was performed twice, 30.0 g of V-65 (Product name) manufactured by Wako Pure Chemical Industries, Ltd. was added as an initiator, nitrogen substitution was further performed twice, and heating was performed at 70° C. for three hours under nitrogen gas stream. Heating was continued until the elimination of peaks derived from remaining monomers and elimination of thiolhydrogen peaks which were the core portion were confirmed by NMR. Methyl ethyl ketone was suitably added, and the concentration of solid contents thereof was adjusted to 10 mass %, so as to obtain a multibranched polymer solution P-1 used in the invention (average particle diameter: 15 nm and weight average molecular weight: 12,300).

The other exemplified polymers may be prepared in the same manner.

The physical properties of the prepared polymer were measured as below.

It was checked that all of the multibranched polymers P-1 to P-8 were amorphous by DSC measurement. Specifically, in the case of P-1, since Tg was −23° C. (250 K), if Tm was able to be observed, it was assumed that 375 K of 1.5 times=about 102° C. Therefore, a change of the chart that was able to be determined a melting point was not seen near the temperature area.

DSC: Differential Scanning Calorimeter (Differential scanning calorimetry analysis)

<Measuring of Average Particle Diameter (Volume Average Particle Diameter)>

(Measuring of Average Particle Diameter of Binder)

The measuring of the average particle diameter of the binder particles is performed in the following order. The binder prepared above was dispersed by using an arbitrary solvent (dispersion medium used in the preparation of the solid electrolyte composition), to prepare 1 mass % of the dispersion liquid. The volume average particle diameter of the resin particles was measured by using this dispersion liquid sample and using a laser diffraction scattering type particle size distribution determination device LA-920 (manufactured by HORIBA, Ltd.).

<Measuring of Average Particle Diameter of Inorganic Particles>

The measuring of the average particle diameter of the inorganic particles was performed in the following order. The inorganic particles were dispersed by using water (heptane in a case where the inorganic particles was made of a material which was not stable in water), to prepare 1 mass % of the dispersion liquid. The volume average particle diameter of the inorganic particles was measured by using this dispersion liquid sample and using a laser diffraction scattering type particle size distribution determination device LA-920 (manufactured by HORI BA, Ltd.).

In Table 1 below, the volume average particle diameter was simply referred to as a "particle diameter".

<Method for Measuring Tg>

The glass transition point was measured in the condition below by using the dry sample above and using a differential scanning calorimeter (manufactured by Sii Technologies Private Limited, DSC7000). The measuring was performed twice with the same sample, and measurement results of the second time were used.

Atmosphere in measuring chamber: Nitrogen (50 mL/min)

Temperature rising speed: 5° C./min

Measurement start temperature: −100° C.

Measurement end temperature: 200° C.

Sample pan: Aluminum pan

Mass of measurement sample: 5 mg

Calculation of Tg: Intermediate temperature between descending start point and descending end point in the DSC chart was set to be Tg

TABLE 1

| | Monomer 1 | | Monomer 2 | | Core forming compound | | Diameter | Tg | Weight average molecular |
|---|---|---|---|---|---|---|---|---|---|
| Name | Type | Mass % | Type | Mass % | Type | Mass % | (nm) | (° C.) | weight |
| P-1 | 2-EtHMA | 90.4 | MA | 4.8 | A-1 | 4.8 | 15 | −23.0 | 12,300 |
| P-2 | 2-EtHMA | 90.4 | MA | 7.2 | A-1 | 2.4 | 25 | −18.2 | 35,100 |
| P-3 | 2-EtHMA | 90.4 | MMA | 4.8 | A-1 | 4.8 | 16 | −21.5 | 13,800 |
| P-4 | BuMA | 95.2 | — | — | A-1 | 4.8 | 20 | 13.2 | 20,200 |
| P-5 | BuMA | 95.2 | PHOSMERM | 2.4 | A-1 | 2.4 | 23 | 18.8 | 33,600 |
| P-6 | 2-EtHMA | 94.0 | PHOSMERM | 1.2 | A-1 | 4.8 | 18 | −23.7 | 15,400 |
| P-7 | 2-EtHMA | 95.2 | MA | 2.4 | A-5 | 2.4 | 26 | −20.4 | 38,500 |
| P-8 | 2-EtHMA | 96.4 | β-CEA | 2.4 | A-5 | 1.2 | 31 | −19.3 | 42,000 |
| Q-1 | 2-EtHMA | 95.0 | MA | 5.0 | | | 70 | 18.3 | 78,200 |

<Note of Table 1>

2-EtHMA: 2-Ethylhexyl methacrylate

MA: Methacrylic acid

MMA: Methyl methacrylate

BuMA: Butyl methacrylate

PHOSMER M: acid phosphoxyethyl methacrylate manufactured by Uni-Chemical Co., Ltd.

β-CEA: 2-Carboxyethyl acrylate

Synthesization of Li—P—S-Based Solid Electrolyte

In a glove box under argon atmosphere (dew point: −70° C.), 2.42 g of lithium sulfide ($Li_2S$, manufactured by Sigma-Aldrich Co., LLC., Purity: >99.98%), and 3.90 g of phosphorus pentasulfide ($P_2S_5$, manufactured by Sigma-Aldrich Co., LLC., Purity: >99%) were respectively weighed, were introduced to an agate mortar, and were mixed for five minutes by using an agate pestle. $Li_2S$ and $P_2S_5$ were $Li_2S$:$P_2S_5$=75:25 in a molar ratio.

66 g of zirconia beads having a diameter of 5 mm was introduced to a 45-mL zirconia container (manufactured by Fritsch Japan Co., Ltd.), the total amount of the mixture of lithium sulfide and phosphorus pentasulfide was introduced, and the container was completely sealed under argon atmosphere. The container was set in a planetary ball mill P-7 manufactured by Fritsch Japan Co., Ltd., and mechanical milling was performed at the temperature of 25° C. at a rotation number of 510 rpm for 20 hours, so as to obtain 6.20 g of sulfide solid electrolyte material (Li—P—S glass) of yellow powder.

Preparation Example of Solid Electrolyte Composition 180 zirconia beads having a diameter of 5 mm were input to a 45-mL zirconia container (manufactured by Fritsch Japan Co., Ltd.), 9.0 g of an inorganic solid electrolyte LLT (manufactured by Toshima Manufacturing Co., Ltd.) [average particle diameter: 50 μm] and 0.5 g (in terms of solid content) of the multibranched polymer P-1 were added, and 15.0 g of methyl ethyl ketone as the dispersion medium was input, a container was set in a planetary ball mill P-7 manufactured by Fritsch Japan Co., Ltd., and mixing was continued for 2 hours at a rotation number of 300 rpm, such that a solid electrolyte composition S-1 was obtained. Other exemplary solid electrolyte compositions were also prepared by the same method (Table 2).

TABLE 2

| Composition | Inorganic solid electrolyte | Mass % | Multibranched polymer | Mass % | Dispersion medium |
|---|---|---|---|---|---|
| S-1 | LLT | 95.0 | P-1 | 5.0 | MEK |
| S-2 | LLT | 97.0 | P-2 | 3.0 | MEK |
| S-3 | LLT | 93.0 | P-3 | 7.0 | MEK |
| S-4 | LLT | 93.0 | P-4 | 7.0 | MFG |
| S-5 | LLZ | 97.0 | P-5 | 3.0 | MEK |
| S-6 | LLZ | 95.0 | P-6 | 5.0 | MEK |
| S-7 | LLZ | 95.0 | P-7 | 5.0 | MFG |
| S-8 | LLZ | 95.0 | P-8 | 5.0 | MFG |
| S-9 | Li—P—S | 97.0 | P-1 | 3.0 | Heptane |
| S-10 | Li—P—S | 97.0 | P-8 | 3.0 | Heptane |
| T-1 | LLT | 100.0 | — | — | MEK |
| T-2 | LLT | 90.0 | Q-1 | 10.0 | MEK |
| T-3 | LLT | 97.0 | Q-1 | 3.0 | MEK |
| T-4 | LLT | 75.0 | PEO | 25.0 | THF/NMP |
| T-5 | LLT | 95.0 | HSBR | 5.0 | Heptane |

<Note of Table 2>

LLZ: $Li_7La_3Zr_2O_{12}$

LLT: $Li_{0.33}La_{0.55}TiO_3$

Li—P—S: Li—P—S glass synthesized above

PEO: Polyethyleneoxide (weight average molecular weight: 3,000) Crystalline polymer compound (melting point: About 60° C.)

THF: Tetrahydrofuran

NMP: N-Methylpyrrolidone

MFG: Propylene glycol monomethyl ether

MEK: Methyl ethyl ketone

HSBR: Hydrogen-added butadiene rubber manufactured by JSR Corporation [Product name: DYNARON 1321P]

(Manufacturing Example of Solid Electrolyte Sheet)

The solid electrolyte composition manufactured above was applied on an aluminum foil having a thickness of 20 μm by an applicator of which clearance can be adjusted, heating was performed at 80° C. for one hour, and heating was further performed at 110° C. for one hour, so as to dry a coating solvent. Thereafter, a copper foil having the thickness of 20 μm was matched, and by using a heating and pressing machine, heating and pressurization were performed to have arbitrary density, so as to obtain a solid electrolyte sheet. The film thickness of the electrolyte layer was 30 μm. Other solid electrolyte sheets were also prepared by the same method.

Preparation of Composition for Positive Electrode of Secondary Battery 100 parts by mass of lithium cobalt oxide [average particle diameter: 11.8 μm], 5 parts by mass of acetylene black, 75 parts by mass of the solid electrolyte composition S-1 obtained above, and 270 parts by mass of N-methylpyrrolidone were added to a planetary mixer (TK HIVIS MIX, manufactured by PRIMIX Corporation), and were stirred for one hour at 40 rpm.

Preparation of Composition for Negative Electrode of Secondary Battery 100 parts by mass of lithium titanate [average particle diameter: 5.7 μm] (Product name: "ENERMIGHT LT-106", manufactured by Ishihara Sangyo Kaisha, Ltd.), 5 parts by mass of acetylene black, 75 parts by mass of the solid electrolyte composition S-1 obtained above, and 270 parts by mass of N-methylpyrrolidone were added to a planetary mixer (TK HIVIS MIX, manufactured by PRIMIX Corporation), and were stirred for one hour at 40 rpm.

Manufacturing of Positive Electrode Sheet for Secondary Battery

The composition for the positive electrode of the secondary battery obtained above was applied on an aluminum foil having a thickness of 20 μm with an applicator having arbitrary clearance, and heating was performed for 1 hour at 80° C. and further performed for 1 hour at 110° C., so as to dry the coating solvent. Thereafter, heating and pressurizing were performed by using a heating and pressing machine so as to have an arbitrary density, such that a positive electrode sheet for a secondary battery was obtained.

Manufacturing of Electrode Sheet for Secondary Battery

The solid electrolyte composition obtained above was applied on the positive electrode sheet for the secondary battery obtained above with an applicator having arbitrary clearance, and heating was performed for 1 hour at 80° C. and further performed for 1 hour at 110° C., so as to dry the solid electrolyte composition. Thereafter, the composition for the negative electrode of the secondary battery obtained above was applied, heating was performed for 1 hour at 80° C. and further performed for 1 hour at 110° C., so as to dry the composition. A copper foil having the thickness of 20 μm was matched on the negative electrode layer, heating and pressurization were performed to have arbitrary density by using a heating and pressing machine, so as to obtain an electrode sheet for a secondary battery. At this point, the respective compositions may be applied at the same time, applying, drying and pressing may be performed at the same time or may be performed sequentially. The respective compositions may be applied on different substrates and be laminated by transfer.

<Evaluation of Electrode Flexibility>

The surface on the collector side of the electrode sheet which was cut to the size of 2 cm×10 cm was wound around a SUS bar having a diameter of 2 mm, existence and nonexistence of peeling when the SUS bar was moved in the longitudinal direction were observed, and electrode flexibility was evaluated from a ratio of the area in which peeling was generated, in the following criteria.

A: 0%

B: Greater than 0% and 5% or less

C: Greater than 5% and less than 20%

D: 20% or greater

<Measuring of Ion Conductance>

A coin battery was manufactured by cutting the solid electrolyte sheet obtained above or the secondary battery electrode sheet obtained above into a disc shape with a diameter of 14.5 mm and inputting the cut solid electrolyte sheet or the cut secondary battery electrode sheet to a stainless steel 2032-type coin case combined with a spacer or a washer. The coin battery was inserted from the outside of the coin battery in a jig that can apply a pressure between electrodes to be used in the various electrochemical measurements. The pressure between the electrodes was 500 $kgf/cm^2$.

Figure 2:
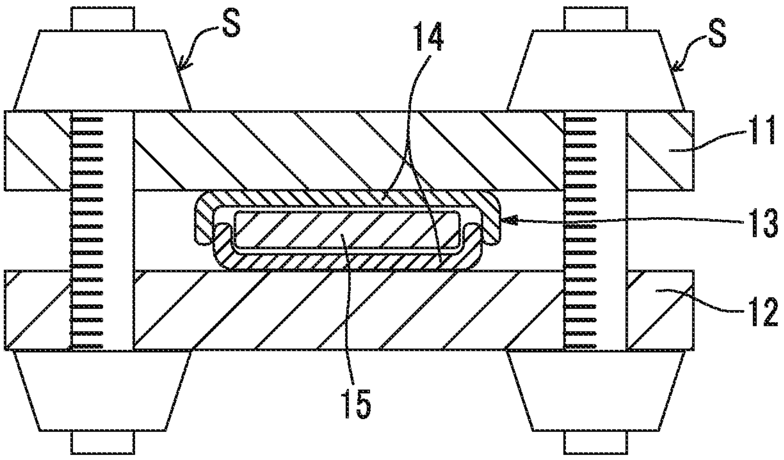
FIG. 2 is a cross-sectional view schematically illustrating a test device used in an example.

The ion conductance was obtained by using the obtained coin battery by the alternating current impedance method in the thermostat of 30° C. At this point, in the pressurization of the coin battery, the test body illustrated in FIG. 2 was used. Reference numeral 11 refers to an upper support plate, Reference numeral 12 refers to a lower support plate, Reference numeral 13 refers to a coin battery, Reference numeral 14 refers to a coin case, Reference numeral 15 refers to an electrode sheet (a solid electrolyte sheet or a secondary battery electrode sheet), and Reference numeral S refers to a screw. In Table 3, the pressurization state represents a case where the ion conductance was measured in a state in which the coin battery is interposed between jigs, and the non-pressurization state represents a case where the ion conductance was measured without pressurizing the coin battery.

TABLE 3

| | Cell configuration | | | | Ion conductance (mS/cm) | |
|---|---|---|---|---|---|---|
| No. | Positive electrode | Electrolyte | Negative electrode | Electrode flexibility | Pressurization state | Non-pressurization state |
| 101 | — | S-1 | — | A | 0.15 | 0.14 |
| 102 | LMO S-1 | S-1 | LTO S-1 | A | 0.10 | 0.09 |
| 103 | — | S-2 | — | A | 0.18 | 0.17 |
| 104 | LCO S-2 | S-2 | Graphite S-2 | A | 0.12 | 0.12 |
| 105 | — | S-3 | — | A | 0.14 | 0.13 |
| 106 | NMC S-3 | S-3 | Graphite S-3 | A | 0.09 | 0.08 |
| 107 | — | S-4 | — | A | 0.14 | 0.09 |
| 108 | NMC S-4 | S-4 | LTO S-4 | A | 0.10 | 0.07 |
| 109 | — | S-5 | — | A | 0.17 | 0.17 |
| 110 | LMO S-5 | S-5 | LTO S-5 | A | 0.12 | 0.11 |
| 111 | — | S-6 | — | A | 0.16 | 0.15 |
| 112 | LMO S-7 | S-6 | LTO S-7 | A | 0.11 | 0.10 |
| 113 | — | S-7 | — | A | 0.15 | 0.14 |

TABLE 3-continued

| | Cell configuration | | | | Ion conductance (mS/cm) | |
|---|---|---|---|---|---|---|
| No. | Positive electrode | Electrolyte | Negative electrode | Electrode flexibility | Pressurization state | Non-pressurization state |
| 114 | LMO S-7 | S-7 | LTO S-7 | A | 0.10 | 0.10 |
| 115 | — | S-8 | — | A | 0.16 | 0.15 |
| 116 | LMO S-8 | S-8 | LTO S-8 | A | 0.12 | 0.10 |
| 117 | — | S-9 | — | A | 0.25 | 0.24 |
| 118 | LMO S-9 | S-9 | Graphite S-9 | A | 0.18 | 0.17 |
| 119 | — | S-10 | — | A | 0.29 | 0.28 |
| 120 | LMO S-10 | S-10 | LTO S-10 | A | 0.20 | 0.19 |
| c11 | — | T-1 | — | D | 0.16 | 0.02 |
| c12 | — | T-2 | — | B | 0.11 | 0.05 |
| c13 | — | T-3 | — | C | 0.16 | 0.03 |
| c14 | — | T-4 | — | C | 0.05 | 0.02 |
| c15 | — | T-5 | — | B | 0.08 | 0.05 |

<Note of Table 3>
Test No.: Examples of which the test numbers start with C are comparative examples
LMO; $LiMn_2O_4$ Lithium manganese oxide
LTO; $Li_4Ti_5O_{12}$ Lithium titanate
LCO; $LiCoO_2$ Lithium cobalt oxide
NMC; $Li(Ni_{1/3}Mn_{1/3}Co_{1/3})O_2$ Nickel, manganese, and lithium cobalt oxide As clearly seen from the results presented in Table 3, the electrode sheet for secondary battery using the solid electrolyte composition according to the invention and the laminated battery had excellent electrode flexibility and had excellent ion conductivity in the non-pressurization state. Accordingly, at the time with handling of the electrode sheet in the manufacturing, the peeling of the solid electrolyte and the electrode active substance did not occur, the electrochemical contact of the solid interface was able to be maintained. Therefore, a mechanism of pressurizing electrodes was not required, and it was expected that the cyclability was favorable. Meanwhile, in the comparative example in which T-1 not including the binder was used, electrode flexibility was inferior, and ion conductivity in the non-pressurization state was greatly inferior. In comparative examples c12 and c13 (T-2 and T-3) in which a straight chain polymer Q-1 was used, if the polymer amount was not caused to be great, electrode flexibility was inferior, and thus it was expected that an adverse influence was given to the battery characteristics. In comparative examples c14 and c15 in which T-4 and T-5 using polyethylene oxide or butadiene rubber was used, electrode flexibility was inferior, and ion conductivity was inferior in the non-pressurization state.

The invention is described with reference to specific embodiments, but, it is considered that it is clear that any details of the invention which are not particularly designated are not intended to limit the invention, and the embodiments are widely construed without departing from the spirit and the scope of the invention recited in the accompanying claims.

This application claims the benefit of priority from prior JP2014-018701 filed on Feb. 3, 2014 and JP2015-013306 filed on Jan. 27, 2015, the entire contents of which are incorporated herein by reference as a part of the description of this specification.

EXPLANATION OF REFERENCES

1: negative electrode collector
2: negative electrode active substance layer
3: inorganic solid electrolyte layer
4: positive electrode active substance layer
5: positive electrode collector
6: operating position
10: all-solid-state secondary battery
11: upper support plate
12: lower support plate
13: coin battery
14: coin case
15: electrode sheet
S: screw

What is claimed is:

1. A solid electrolyte composition comprising:

an inorganic solid electrolyte; and a multibranched polymer, wherein the multibranched polymer is an amorphous polymer and includes a core portion and at least three polymeric arm portions that bond to the core portion, wherein the multibranched polymer is expressed by Formula (1) below, $$L\text{-}(\text{-}S—P^1)_n \qquad (1)$$

in the formula, L represents a trivalent or higher polyvalent linking group, $P^1$ represents a polymer chain, n represents an integer of 3 or greater, $P^1$ of the different n integers may be identical to or different from each other, $L\text{-}(S)_n$ forms a core portion, and $P^1$ forms an arm portion, wherein the multibranched polymer is applied by 0.1 parts by mass to 10 parts by mass with respect to 100 parts by mass of the inorganic solid electrolyte, and wherein the arm portion contains at least one repeating unit expressed by Formula (I) below, (I)

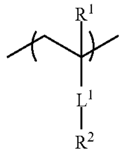

in the formula, $R^1$ represents a hydrogen atom, a halogen atom, a cyano group, an alkyl group, an alkoxy group, or an aryl group, $R^2$ represents a hydrogen atom, a halogen atom, a cyano group, an acidic group, an alkyl group having a hydroxy group, or an aryl group having an acidic group or a hydroxy group, and $L^1$ represents a single bond or a bivalent linking group.

2. The solid electrolyte composition according to claim 1, wherein the $L^1$ is a bivalent linking group selected from a single bond, —CO—, —O—, —$NR^N$—, —COO—, —OCO—, —OCOO—, —$CONR^N$—, arylene, alkylene, or a combination thereof, and $R^N$ represents a hydrogen atom, an alkyl group having 1 to 6 carbon atoms, or an aryl group having 6 to 14 carbon atoms.

3. The solid electrolyte composition according to claim 1, wherein the $R^2$ is a group having an acidic group or a hydroxy group.

4. The solid electrolyte composition according to claim 1, wherein the $R^2$ is a group including at least one selected from a carboxyl group or a salt thereof, or a phosphoric acid group or a salt thereof.

5. The solid electrolyte composition according to claim 1, wherein the arm portion is composed of a polymer chain, and a copolymerization ratio of the repeating unit having a functional group A selected from the group consisting of a halogen atom, a cyano group, an acidic group, a hydroxy group, an amino group, or an amide group with respect to the repeating units that form the arm portion is 0.1 mol % to 40 mol %.

6. The solid electrolyte composition according to claim 1, wherein L is a linking group including a carbon atom, a hydrogen atom, and an oxygen atom.

7. The solid electrolyte composition according to claim 1, wherein the multibranched polymer is expressed by Formula (2) below, and

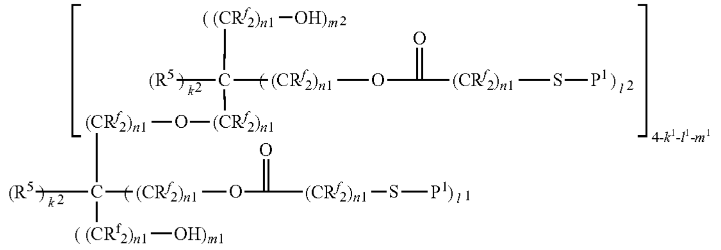

(2)

in the formula, each of $R^5$ and $R^f$ independently represents a hydrogen atom or a substituent, each of n1's independently represents an integer of 0 to 10, $k^1$ represents an integer of 0 to 3, $l^1$ represents an integer of 0 to 4, $m^1$ represents an integer of 0 to 3, $k^2$ represents an integer of 0 to 3, $l^2$ represents an integer of 0 to 3, $m^2$ represents an integer of 0 to 3, a sum of $k^1$, $l^1$, and $m^1$ is 4 or less, a sum of $k^2$, $l^2$, and $m^2$ is 3 or less, $l^1+l^2\times(4-k^1-l^1-m^1)$ is 3 or greater, the number of groups having $P^1$ in the formula is 3 or greater, $P^1$ represents a polymer chain, $R^f$ represents a hydrogen atom or a substituent, $P^1$ is an arm portion, and portions other than $P^1$ are core portions.

8. The solid electrolyte composition according to claim 1, wherein the core portion is an atom group having a molecular weight of 200 or greater.

9. The solid electrolyte composition according to claim 1, wherein a weight average molecular weight of the arm portion is 500 to 1,000,000.

10. The solid electrolyte composition according to claim 1, wherein a glass transition point of the multibranched polymer is 100° C. or less.

11. The solid electrolyte composition according to claim 1, further comprising:

a dispersion medium.

12. The solid electrolyte composition according to claim 11, wherein the multibranched polymer is dispersed in a dispersion medium, and an average particle diameter of the multibranched polymer is 1 nm to 1,000 nm.

13. The solid electrolyte composition according to claim 1, further comprising:

an active substance that can insert and discharge a metal ion belonging to Group 1 or 2 of the periodic table.

14. An electrode sheet for a battery, wherein a film is formed on a metallic foil with the solid electrolyte composition according to claim 1.

15. An all-solid-state secondary battery, comprising:

a positive electrode active substance layer;

a negative electrode active substance layer; and an inorganic solid electrolyte layer, wherein at least one of the positive electrode active substance layer, the negative electrode active substance layer, or the inorganic solid electrolyte layer is formed with the solid electrolyte composition according to claim 1.

16. A method for manufacturing an electrode sheet for a battery comprising:

disposing the solid electrolyte composition according to claim 1 on a metallic foil; and forming a film with the solid electrolyte composition.

17. A method for manufacturing an all-solid-state secondary battery, wherein, through the manufacturing method according to claim 16, an all-solid-state secondary battery having the electrode sheet for a battery is manufactured.

* * * * *